United States Patent
Hall

(10) Patent No.: US 11,094,213 B2
(45) Date of Patent: Aug. 17, 2021

(54) COMMUNICATIONS SYSTEM FOR PROMPTING STUDENT ENGAGED CONVERSATION

(71) Applicant: Jarrid Austin Hall, Barrington, RI (US)

(72) Inventor: Jarrid Austin Hall, Barrington, RI (US)

(73) Assignee: Jarrid Austin Hall, Barrington, RI (US)

( * ) Notice: Subject to any disclaimer, the term of this patent is extended or adjusted under 35 U.S.C. 154(b) by 0 days.

(21) Appl. No.: 15/469,468

(22) Filed: Mar. 24, 2017

(65) Prior Publication Data

US 2017/0278413 A1 Sep. 28, 2017

Related U.S. Application Data

(60) Provisional application No. 62/313,664, filed on Mar. 25, 2016.

(51) Int. Cl.
*G09B 5/00* (2006.01)
*G09B 5/14* (2006.01)
*G09B 7/02* (2006.01)

(52) U.S. Cl.
CPC ............ *G09B 5/14* (2013.01); *G09B 7/02* (2013.01)

(58) Field of Classification Search
CPC . G09B 19/00; G09B 5/14; G09B 7/02; G06Q 50/20; G06Q 50/205; H04W 4/12
See application file for complete search history.

(56) References Cited

U.S. PATENT DOCUMENTS

| 6,464,222 | B1 | 10/2002 | Parker | |
|---|---|---|---|---|
| 9,129,239 | B2 | 9/2015 | Rogers et al. | |
| 2006/0127870 | A1 | 6/2006 | Fields et al. | |
| 2006/0286542 | A1* | 12/2006 | Stevens | G09B 19/18 434/365 |
| 2007/0298401 | A1 | 12/2007 | Mohanty et al. | |
| 2009/0047650 | A1* | 2/2009 | Leuck | G09B 7/02 434/350 |
| 2010/0112540 | A1* | 5/2010 | Gross | G09B 5/10 434/351 |
| 2012/0028660 | A1* | 2/2012 | Stafford | H04W 4/12 455/466 |

(Continued)

OTHER PUBLICATIONS

International Search Report and Written Opinion dated Jun. 16, 2017, regarding PCT/US2017/024198.

*Primary Examiner* — Peter R Egloff
(74) *Attorney, Agent, or Firm* — Procopio, Cory, Hargreaves & Savitch LLP

(57) ABSTRACT

A system for prompting student engaged conversation, the system receives a student entered limited descriptive entry at a first remote terminal, stores the entry, e.g., in a central database, and sends a notification of the entry to a teacher of the student at a second remote terminal. The system may also send a second notification regarding the entry to a parent of the student at a third remote terminal. The second notification may be triggered by a teacher response or submission in response to the first notification. The first and second notifications may be sent using any of a text, a voicemail, an e-mail, a display message, an application operating at a mobile device, and a program operating a remote terminal.

22 Claims, 14 Drawing Sheets

(56) References Cited

U.S. PATENT DOCUMENTS

| | | | |
|---|---|---|---|
| 2012/0301855 A1* | 11/2012 | Hollaar | G09B 19/00 434/238 |
| 2013/0104246 A1* | 4/2013 | Bear | H04L 63/10 726/28 |
| 2013/0137078 A1* | 5/2013 | Shustorovich | G09B 7/00 434/362 |
| 2013/0157242 A1* | 6/2013 | Leonardo | G09B 7/00 434/322 |
| 2013/0290211 A1 | 10/2013 | Cho | |
| 2013/0330704 A1 | 12/2013 | Creamer et al. | |
| 2014/0065593 A1* | 3/2014 | Gannon | G09B 7/06 434/350 |
| 2014/0164909 A1 | 6/2014 | Graff et al. | |
| 2014/0188484 A1* | 7/2014 | Huang | G06F 3/0481 704/275 |
| 2014/0272912 A1* | 9/2014 | Rozycki | G09B 5/08 434/362 |
| 2015/0120595 A1 | 4/2015 | Zhou et al. | |
| 2015/0178682 A1* | 6/2015 | Matthews | G06Q 10/1053 705/321 |
| 2015/0187220 A1 | 7/2015 | Patel | |
| 2016/0027318 A1* | 1/2016 | Rao | G09B 5/06 434/309 |
| 2016/0092935 A1* | 3/2016 | Bradley | G06Q 30/0276 705/14.72 |
| 2016/0148515 A1* | 5/2016 | Augusto | G09B 5/00 434/365 |

\* cited by examiner

COMMUNICATIONS SYSTEM FOR PROMPTING STUDENT ENGAGED CONVERSATION

CROSS-REFERENCE TO RELATED APPLICATION

This application claims the benefit of U.S. Provisional Application Ser. No. 62/313,664, entitled "The Dinner-x-Change Platform: Student-In-The-Loop Communications" and filed on Mar. 25, 2016, which is expressly incorporated by reference herein in its entirety.

BACKGROUND

Field

The present disclosure relates generally to communication systems, and more particularly, to a communication system for prompting student engaged conversation.

Background

Five days a week parents ask their kids the same question in a variety of ways, and five days a week parents receive very little information in response. Parents ask "How was your day at school?" and receive the response "Fine." Parents ask "What did you do today?" and receive the answer "Not much." Parents ask "Anything new happen today at school?" and receive the response "Not really." Parents ask "How did your day go?" and receive the answer "Good." There are a multitude of reasons for this. Kids have incredibly busy days, they cannot remember it all, they may not be able to prioritize what is important to tell, they are tired, or kids literally cannot remember. Whatever the reason, it can be incredibly frustrating for parents to not have insight into their child's daily activities and equally as frustrating for the child to hear that same question every single day.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein provide a communication tool that provides parents a "window into their child's day." Aspects of the tool promote conversation between parents and their children leveraging the child's school day activities. It can be a platform to provide a simple way to answer a parent's questions "How was your day? What did you do at school today?" For most children, their days are busy with classes, information and experiences. By the time kids get home and face the big question they are tired, unsure where to start, or what to talk about. Aspects provided herein address the unique needs of children with the executive function challenges (EF) of working memory often found in ADHD, Dyslexia and Autism amongst others. For some children with such executive function challenges, they are neurologically challenged in their ability to recount the day. For the EF child it can be critical to note that they are not lazy, slow or otherwise lacking in desire to remember but physically their brains are not able to recount the day on demand. For an EF child reminders or primers provided by the communication system presented herein enable the conversation all parents are looking for. The communication system presented herein and use of GABs can be included in a student's IEP or 504 plan to utilize the "Student-In-The-Loop Communications" system that provides a tool that encourages recall, supports greater parent communications, and provides parents with a window into their child's day.

In an aspect of the disclosure, a method, a computer-readable medium, an apparatus, and a system are provided for prompting student engaged conversation. The system receives a student entered limited descriptive entry at a first remote terminal, stores the entry, e.g., in a central database, and sends a notification of the entry to a teacher of the student at a second remote terminal. The system may also send a second notification regarding the entry to a parent of the student at a third remote terminal. The second notification may be triggered by a teacher response or submission in response to the first notification. The first and second notifications may be sent using any of a text, a voicemail, an e-mail, a display message, an application operating at a mobile device, and a program operating a remote terminal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
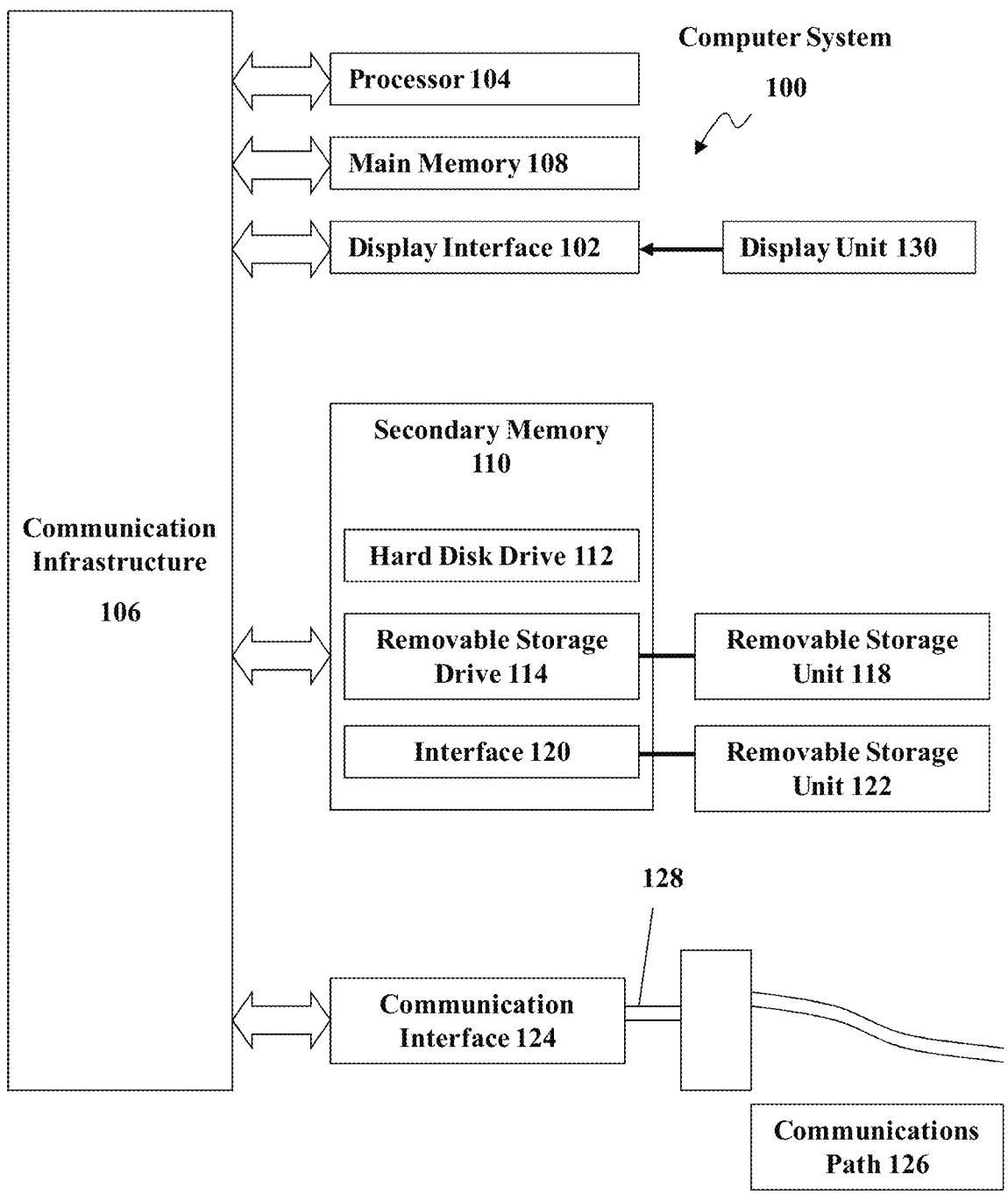
FIG. 1 is an example system diagram of various hardware components and other features, for use in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a parent, student, and teacher communication system will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects presented herein provide a communication tool that provides parents a "window into their child's day." Aspects of the tool promote conversation between parents and their children leveraging the child's school day activities. It can be a platform to provide a simple way to answer a parent's questions "How was your day? What did you do at school today?" For most children, their days are busy with classes, information and experiences. By the time kids get home and face the big question they are tired, unsure where to start, or what to talk about. Aspects provided herein address the unique needs of children with the executive function challenges (EF) of working memory often found in ADHD, Dyslexia and Autism amongst others. For some children with such executive function challenges, they are neurologically challenged in their ability to recount the day. For the EF child it can be critical to note that they are not lazy, slow or otherwise lacking in desire to remember but physically their brains are not able to recount the day on demand. For an EF child reminders or primers provided by the communication system presented herein enable the conversation all parents are looking for. The communication system presented herein and use of GABs can be included in a student's IEP or 504 plan to utilize the "Student-In-The-Loop Communications" system that provides a tool that encourages recall, supports greater parent communications, and provides parents with a window into their child's day.

GAB

Figure 6:
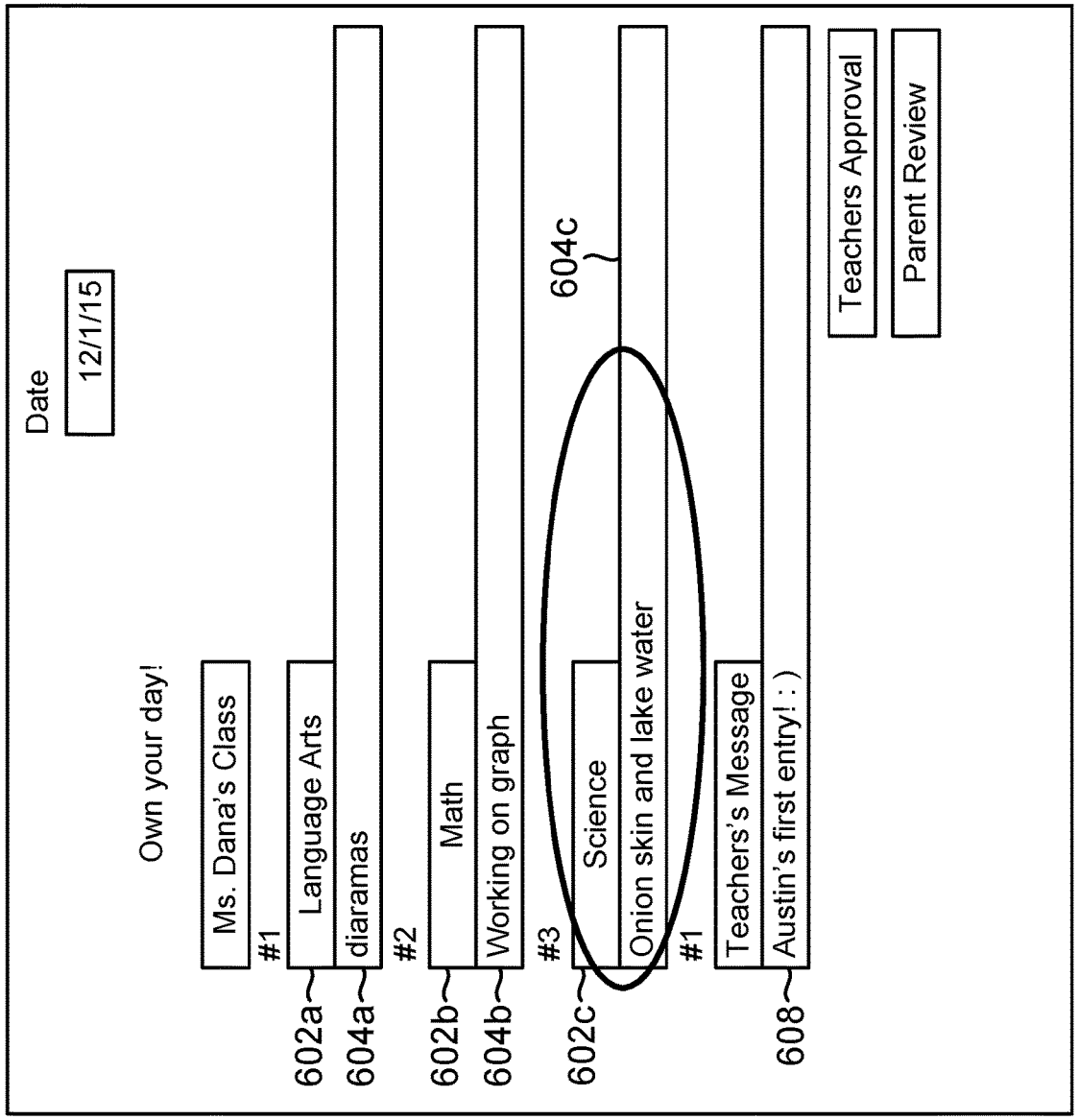
FIG. 6 is an example user interface in an example communication system in accordance with aspects presented herein.

A GAB may comprise a few words that may be entered into the communication system presented herein that may be provided to the student's parents are a hint or a prompt for a topic, incident, discussion that the student could share with their parents. A GAB may also be referred to herein as a "limited descriptive entry" whether student entered or teacher entered. FIG. 6 illustrates an example user interface 600 showing multiple GAB entries 604a, 604b, 604c for corresponding subjects 602a, 602b, 602c. The GAB may refer to something that the student witnessed or participated in during a class or other event, and may act as a prompt, hint, or reminder for the student to begin a discussion about the event with their parents. The system may allow both the students and teachers to create and enter GABs. The intent of the GAB is it to be a few words to act as a reminder of something in the day, not a descriptive sentence. It may be recommended that students or teachers names are not used, or the use of names may be restricted. A GAB can be 1-4 words, but usually not in a sentence format. Therefore, a word limit or a character limit may be imposed by the system. The GAB can be a catalyst that supports the child to remember what they witnessed so they can tell a full story about a situation or event to their parent(s). The GAB provides no context or description—the intent is that the student can provide the details, context and perspective in a story form using a character, setting, problem and solution. Although the intent is to use a small number of words as a reminder, the system can also accept pictures and short videos or GIFs that can either accompany the GAB or be the GAB. The user interface 600 may also enable a teacher to enter a message 608, which may also have a size limitation, similar to a GAB. The teacher message may be provided at a user interface to the parent of the student and may provide context for the student's GAB entry. The teacher message may also prompt the parent to ask questions about topics/events not addressed by the student's GAB(s).

In FIG. 6, the student entered a GAB 604c "onion skin and lake water." For example, after looking at onion skins under a microscope a student and his class might be told by the teacher they were going to the lake to get water samples. They might look at the water samples under the microscope when they got back. The students may be asked by the teacher to put on their jackets, handed a vile to collect water and then the student and his class may walk to the pond by the school and took a sample of water which they looked at under a microscope and discovered a water bug. Additional details may include that the water bug had eggs attached to it, the students named the water bug Robetta, and they proceeded to create a comic book about Robetta and her family and their life in the pond. By asking about "onion skin and lake water," a parent could prompt the student to remember this portion of their school day and to engage them in conversation about the student's experience in a way that would not be possible without the communication system presented herein. Additional conversation could be started about pond life, the microscope use, who was on the comic book development team and much more.

Although scientific research provides evidence that a family that eats dinners together sees great benefits to the social, academic, mental and physical health as a child grows, the dinner table may be becoming less of a central place for families to meet and connect. Parents' work and related schedules are full; children's schedules include school, sports and other activities that keep them out of the house until after the usual dinnertime. Gathering together around the dinner table may be happening less frequently for families. There may no longer be a consistent, reliable time in a day for a family to connect. The key to dinner conversation is a family community gathered to connect and share mutual discussions and have fun. The concept of the communication system presented herein can be to enable and foster that Dinner Table Conversation—Anywhere, Anytime, e.g., dinner conversation, breakfast conversation, restaurant conversation, waiting room conversation, conversation during devices to/from events, conversation over the telephone when a parent is away, car conversations, etc.

By enlisting the teacher's support through the tools provided herein and by incorporating "student-in-the-loop" practice, the present communication system can provide a "window into a child's day" and helps to encourage and promote parent-child communication—like at a dinner table—anytime and anywhere. The unique aspect of this tool is its "student-in-the-loop" approach. The present communication system solves the problem of communication that tools go directly between parent and teacher, where a student perspective, context, or detail is not included. "Student-in-the-loop" brings the child into the process. A student(s) can enter the GABs—a brief hint (few words) of a specific part of their day—onto the communication system presented herein platform during the school day for themselves or for an entire class; with teacher approval, they can be entered into the communication system presented herein platform for a parent to retrieve and talk about with the child as the child leverages the GABs as a catalyst for a family conversation.

Based on research and user experience, teachers do not have the time to communicate with every family every day. With the communication system presented herein application and proposed process, a teacher can spend 30 seconds to 1 minute per class a day and can provide parents insight into every student's day, every day. The teacher can designate a student(s) daily or weekly to be responsible for inputting GABs that provide reminder and context that only the students who attended that class can understand. Once the student enters the GABs they are sent to the teacher for review. The teacher can approve or edit the GABs and then can approve them by pressing the Teacher Submittal button. The teacher can also have their own section for an additional GAB(s) that they feel the child may be excited and able to discuss at home. There can be additional GAB(s) for administrators, principals or other contributors in or related to the school. The GABs can then be loaded into a central database for subscribers of that teacher's GABs. Subscribers can be parents, family members or guardians of students who attend the teacher's class. They can sign up to receive GABs from any teacher the child has and can receive a notification that the GABs have been loaded each day. They can have access to their child's teacher's GABs. At dinner or some time when the parent and child have time to talk, the parent can access that child's GABs via a computer or via the communication system presented herein App on a smart phone. If the parent wishes to provide an electronic free discussion they can print the GABs.

As the GABs are hints (not a full sentence, but a few words) of a lesson, experience or event that happened at a particular point of a child's day, when the child reads the GABs at home with the family, the retrieval process of the details surrounding the GAB can promote working memory and executive functioning challenges. When a child first reads a GAB their initial reaction may be unknowing or no memory of it but, after a few seconds to a minute, with the GAB as the primer and the brain retracing the day to that moment, the "aha" factor and recollection of the details to explain the GAB can be an accomplishment. It also can be a catalyst that leads to other details/activities from their day that may be unrelated to that GAB. More information! And a detailed, fun way to answer "What did you do at school today?"

Each GAB that may be reviewed by the parent can be tracked by pushing the "GAB Complete" button. Each time the "GAB Complete" button can be pressed a point could be awarded to the student. Each student or family can have an account that can track the points each child accumulates. A level of success can be awarded to students as they progress in accumulating the points. A reward system can also be set up in the class room by the teacher and at home by the parent. The points can also easily be debited from accounts as they are cashed in for privileges or access to special features or products on the communication system presented herein. However, a running total of points can be kept to ensure accurate level and privileges can be tracked throughout the year.

The communication system presented herein can also provide reporting capabilities for teachers, administrators, etc. to generate reports showing a "Teacher's GAB" submittal by day, week, month, and school year. This can track the teacher's outreach to families and identify which parents are engaged in the process.

Educational information can be provided with the communication system presented herein to support all users: Students, Teachers, Parents, and Administrators. There can also be educational information for teachers to include families and gain their involvement in the communication system presented herein process.

The communication system presented herein is a representation of a technological too to prompt dinner table conversation, anywhere, anytime. The features of the tool provide a process and technology that address the unique challenges of children and parents in working to "connect, grow and create new life opportunities" from the simple act of having a consistent two-way conversation that the child starts by leveraging the GABs to recount points in time or events from their day. The value of the ongoing parent/child communication over dinner or other time for discussion is documented in multiple scientific studies.

The communication system presented herein provides a multiplatform solution that enables daily connection of teachers, students and parents. The platform enables parents to get a window into their child's day (as seen through the eyes of the child) captured and presented at a user interface via GABs. When the child and parent have time to talk over dinner, in the car, at a restaurant, etc., the child can refer to the GABs from the day and recount his/her day with their parents. The platform can provide a hub for various user interfaces, e.g., including user interfaces for signing up, signing in, a landing page to get access to a teacher's GAB report. The platform provides a central location through which all GABs may flow and from which the GAB application at multiple remote devices may pull and receive data and updates.

The communication system presented herein may provide a market for trading, purchasing or redeeming points for products like forms for GAB entry, skins, logos, pictures, styles to update the GAB reports and the GAB entry form. There may also be products for sale or redeemed by points that may support better use of GABs. The market may be the central location that may manage all the points awarded and redeemed and track points over the course of the school year to enable reporting, and track progress of students, parents and teachers in the GABing process. The market may also be a place for sponsors, advertisers and donors to support the platform and help promote parent/child communications with rewards, giveaway's, contests, point redemption and other enticements to encourage students to capture the GABs and children to engage with parents. The market may also contain games and apps that can be accessed or downloaded—some free, some for purchase—to further enhance the "Dinner Table Conversation—Anywhere, Anytime" theme. Students are also able to share points with other students in their school or anywhere in support of a project in which other students are engaged.

Community

The communication system presented herein may include a community portion as a place for teachers to share with other teachers, e.g., to share their experiences, ideas and thoughts about leveraging the communication system presented herein. The community portion may be provided as a webpage of the communication system or as a forum accessible via a teacher user interface. For example, the teacher community may enable teachers to enter comments, notes, links, etc. that are posted to a teacher webpage. In another example, teachers may link with other teachers, schools, communities, or other groups within the communication system. Then, when a teacher enters a comment or other information to be shared with the community, the comment may be sent or otherwise provided to those with which the teacher is linked. The community portion may also enable parents to share their thoughts, ideas about dinner table conversation and encouragement for other parents in the effort to maximize the use of the platform and consistently get a "window into their child's world." The system may provide information available for download (video or documents), connection with experts, and places to highlight and write or provide video of new experiences. The system may also allow teachers and/or parents to upload such information to be shared with other users.

GAB Report

Figure 7:
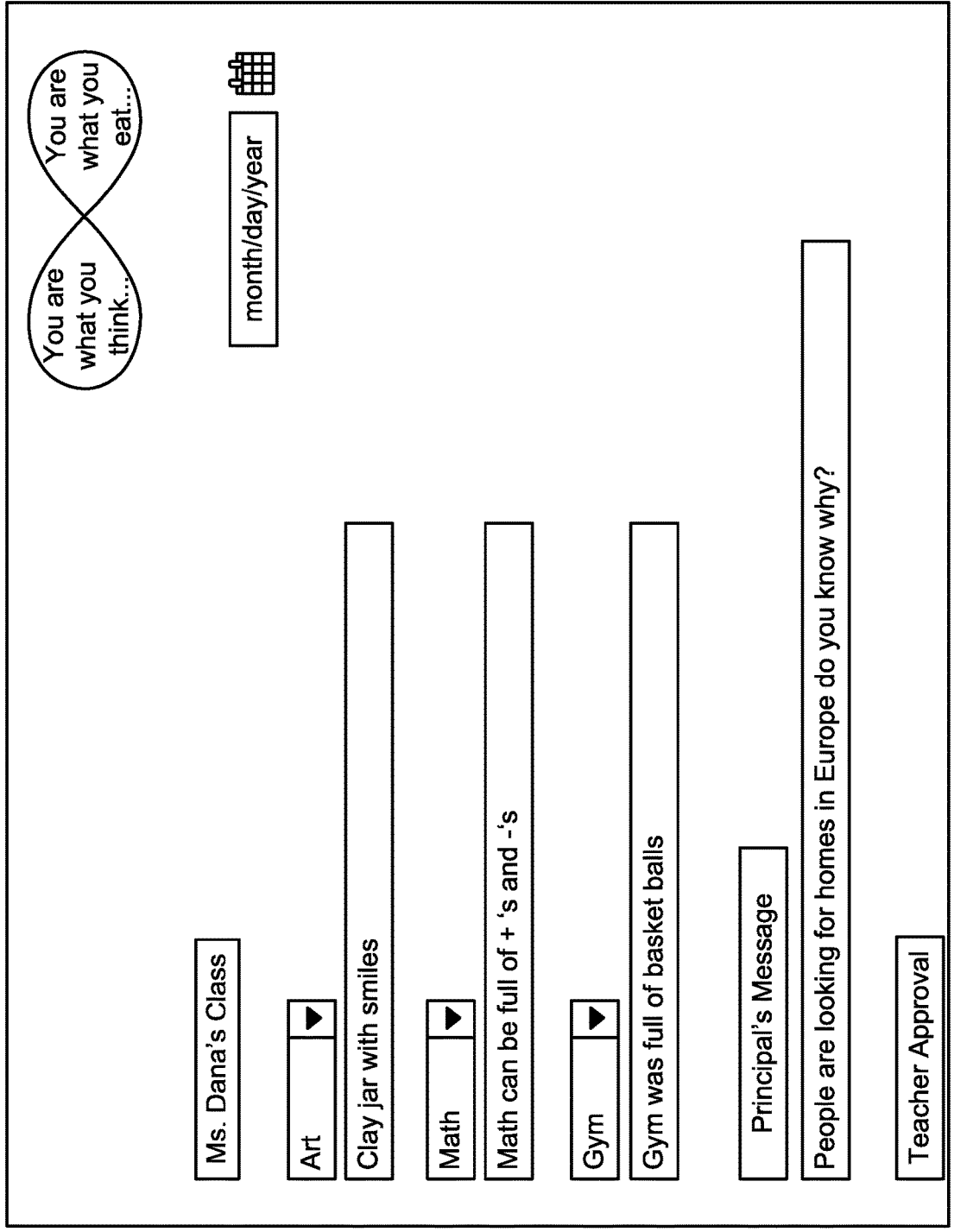
FIG. 7 is an example user interface in an example communication system in accordance with aspects presented herein.

FIG. 7 illustrates an example user interface page 700 that may be provided in connection with the communication system presented herein. This user interface may be referred to as a "GAB report." The GAB Report may list or identify the GABs that the parent has subscribed to. It may include the student GABs, teacher GABs and any additional GABs that the parent has subscribed to. All GAB subscriptions may aggregate into one Report per child that may include all subscribed Teacher Feeds and Leader Feeds. It may track the date and provide a place to insert school, class or other logos. Both the teacher and parent can modify the form to fit their respective needs. This format may also change depending on how many teachers and other leaders the parents subscribe to. The GAB report can also be "decorated" by students with decals, logos, colors, designs etc. that may be available on the present platform or imported from other approved sources. Students may also be able to have special content loaded on their school and home pages such as Comics, stories, cartoons for an additional cost.

Student-in-the-Loop Communication

Most communication from the teacher and/or school go directly to the parent by text, newsletter, on line form or email and are entirely void of the student context, perspective and related conversation with parents. The present "Student-in-the-Loop" communication system inserts the child into the teacher-to-parent communication process. A student enters GABs—a brief hint limited to a few words about a specific part of their day—into a user interface of the system during the school day; the teacher reviews the student GABs, edits if necessary, and submits them into the system database. Then the teacher adds their GAB(s) and submits them to the system database. The parent subscribing to that teacher's class GABs can be notified of the GABs (student's and teacher's) availability for retrieval. Upon retrieval the parent makes the GABs available to the child either by smart phone, computer or printed copy at the dinner/breakfast table, in the car, any time when they can communicate. The child leveraging the GAB as a reminder or hint recounts the part of the day or event to which the GAB may be referring—both the student and teacher sections. Student-in-the-loop communications directly connect the student and parent using a daily communication network tool that both promotes and enables parent child communications via the student-in-the-loop communication system. Incorporated into the process can be a tracking system that provides points for the GABs reviewed and details provided by the child for each GAB as the student recounts these events, topics and experiences with their parents.

Teacher Feed

When a teacher creates an account in the system, parents may be presented with an option to subscribe to the Teacher's GAB(s). When a teacher submits GAB(s), student or teacher, these GAB(s) can then be viewed by parents and considered the Teacher Feed, the GABs may be collected by a central processor and distributed to the corresponding parent's application or user interface. The GAB Report may captures all the Teacher Feeds the parent has subscribed to and can be the medium by which the feeds are presented to the parent. When parents create an account they may identify which teachers they want to receive GAB(s) from via the sign up process. Once the parent chooses the teacher or teachers from which they may like to receive Teacher Feeds—they may be subscribed to the feed and may receive them for the remainder of the school year. Teacher Feeds can be added and deleted based on their child's registration/ engagement with teachers throughout the school year.

Leader Feed

Similar to a teacher's feed, other leaders may (coach, music teacher, etc.) create an account in the communication system presented herein. Once created, parents may be presented with an option to subscribe to the Leader's GAB (s). When a Leader submits their GAB(s), student or leader, to the communication system provides these GAB(s) to be viewed by parents and considered the Leader Feed. The GAB Report captures all the Leader Feeds the Parent has subscribed to and can be the medium by which the feeds are presented to the parent. When parents create an account they may identify which Leader they want to receive GAB(s) from via the sign up process. Once the parent chooses the leader or leaders from which they may like to receive Leader Feeds—they are subscribed to the feed and may receive them for the remainder of the year. Leader Feeds can be added and deleted based on their child's registration/engagement with Leaders throughout the year.

Executive Function

Executive function and self-regulation skills are the mental processes that enable us to plan, focus attention, remember instructions, and juggle multiple tasks successfully. Just as an air traffic control system at a busy airport safely manages the arrivals and departures of many aircraft on multiple runways, the brain needs this skill set to filter distractions, prioritize tasks, set and achieve goals, and control impulses. Additional aspects are described at http://developingchild.harvard.edu/science/key-concepts/executive-function/, the entire contents of which are incorporated by reference herein.

Working Memory

Working memory is one of the brain's executive functions. It's the ability to hold onto new information so we can turn around and use it in some way. Working memory allows us to hold information without losing track of what we're doing.

Working Memory is the thinking skill that focuses on memory-in-action: the ability to remember and use relevant information while in the middle of an activity. For example, a child is using their Working Memory as they recall the steps of a recipe while cooking a favorite meal.

Children who have trouble with their Working Memory skills may often have difficulty remembering their teachers' instructions, recalling the rules to a game, or completing other tasks that involve actively calling up important information.

Additional aspects of working memory as described at http://learningworksforkids.com/skills/working-memory/, the entire contents of which are Incorporated Herein by Reference.

Window into a Child's Day

The intent of the communication system presented herein is to provide a tool so parents can hear from their children how their day was; it answers the question—what did they do that day? Most parents ask how their child's day was, what they did in school? And many parents do not get an answer that provides them information that enables them to know what their child did that day. Parents want to engage with their children on this topic to learn, understand, gain context, get insight about their child, their experiences, and how the child sees and feels about their daily activities and environment. The communication system presented herein provides the platform for a child to leverage when they recount their day—thus providing their parents with a "window into the a child's day"—the child's context, perspective and insight. The intent is to open windows of the day that can be discussed any time the child and parent have time: dinner, via phone or video call, breakfast, car rides, etc.

Student-in-the-Loop Communication via the Communication System

Figure 8:
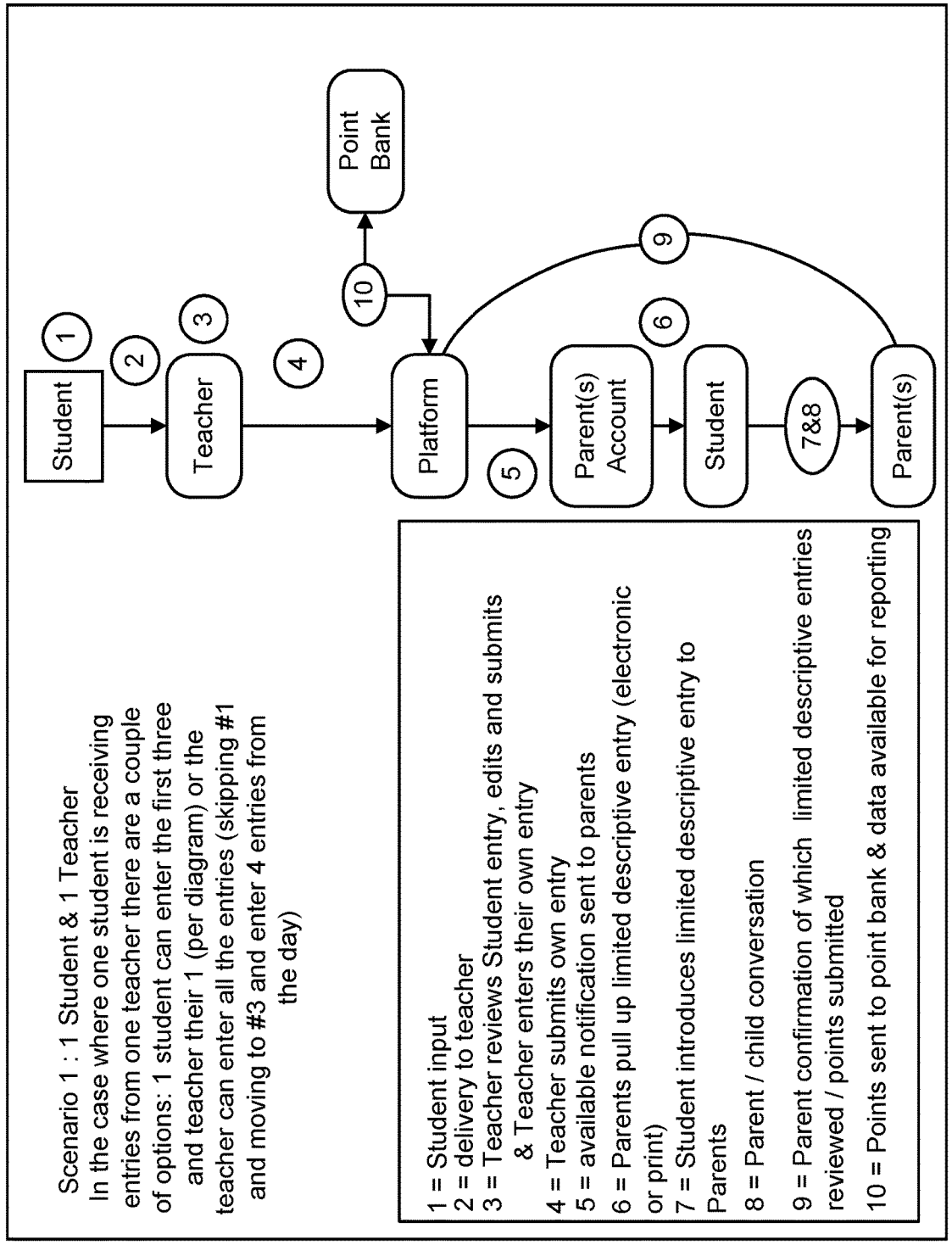
FIG. 8 is an example communication flow diagram for an example communication system for a single child and a single teacher in accordance with aspects presented herein.
Figure 9:
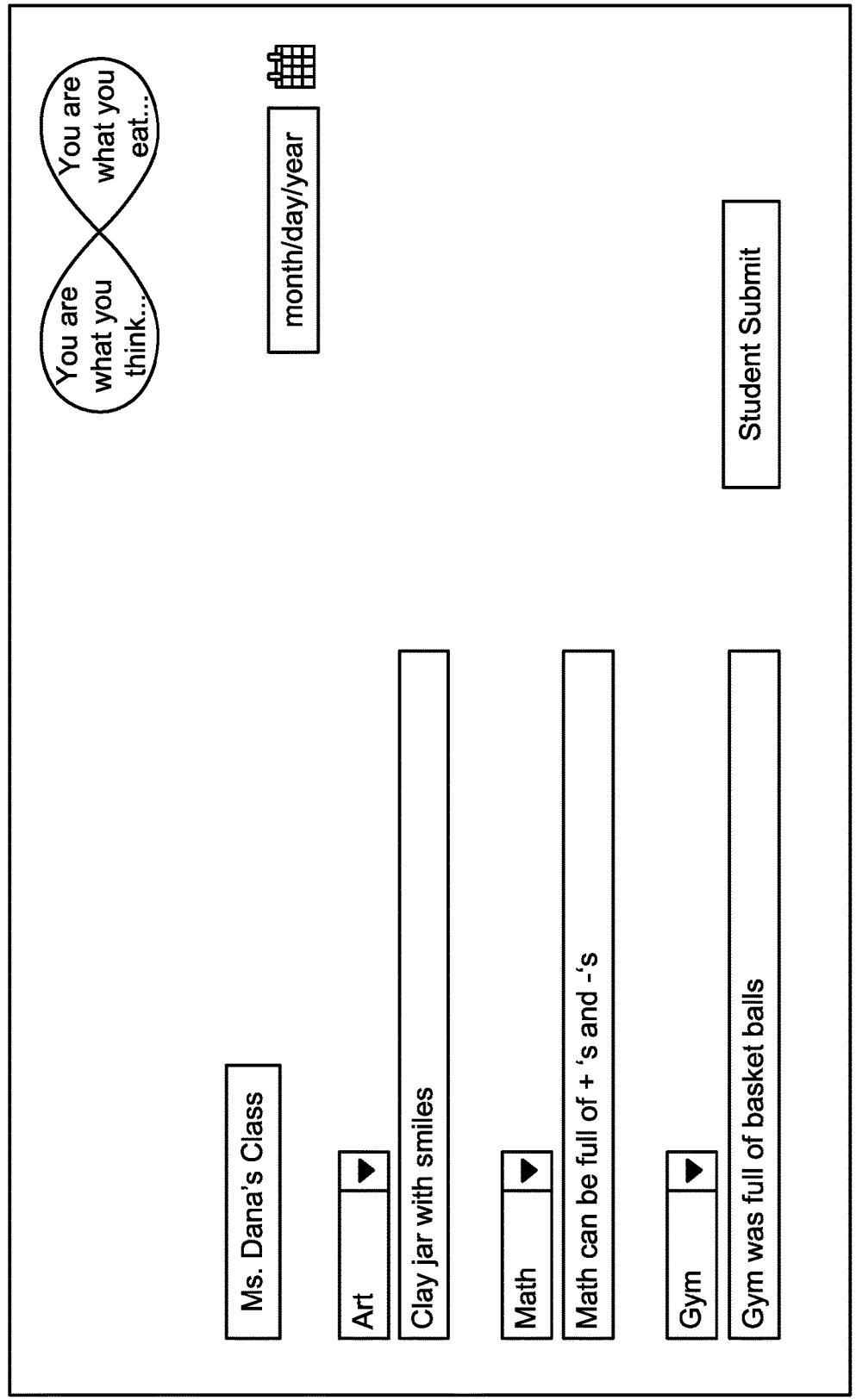
FIG. 9 is an example user interface in an example communication system in accordance with aspects presented herein.

FIG. 8 illustrates an example communication flow 800 in the communication system presented herein. This example illustrates the flow of communication for a single teaches and a single student. First, a student inputs at least one GAB, the GAB may also be entered by the teacher. The GAB may be entered by the student or teacher at a GAB entry user interface. FIG. 9 illustrates an example GAB entry user interface 900. The student may log into a Student GAB section via a computer, tablet or smartphone. The student can be reminded by the teacher or other mechanism to enter the GAB(s) either as part of an assigned curriculum by the teacher or reminded via the computer, tablet or phone they are working with. A student can enter GAB(s) for just their parents to see or a student can enter GAB(s) for all the parents with children in the class to see. The student, teacher or support person can click either student only or full class to determine who the GAB may be shared with.

The GAB entry user interface may enable the user to select a subject, e.g., the illustrated subject selections include art, math, and gym. Other numbers of data sections may be provided depending, e.g., on a teacher defined set up. Each data section may comprise a drop down menu of classes or events that take place in the school (e.g. math, science, social studies, recess, language arts, art, music, recess, gym, etc.). The user interface may receive a student entry of a class or event from the drop down menu and under it, and entry of a GAB in a corresponding space. Thus, the GAB entry user interface may also include a portion for receiving entry of a corresponding GAB for each of the selected subjects. For example, for the subject "art," GAB "Clay jar with smiles" has been entered; for the subject "math," GAB "Math can be full of +'s and −'s" has been entered, and for the subject "gym," GAB "Gym was full of basket balls" has been entered. The user interface may also receive a date for the entry and may include a button for a user to submit the entry for processing in the communication system.

If the child may be not able to enter the GABs themselves due to age, impairment or other reason, the teacher can enter the GAB(s) as well. Many children are so busy during the day with classes, recesses, hallway conversations, lunch, gym music etc. that they can't remember their day or they don't understand what may be appropriate or relevant for a dinner conversation. For children who have working memory challenges their brains are not able to recall what happened during their day. These children do not have the information available to answer questions or initiate a conversation. The GAB provides a tool that parents can access for a gentle reminder or hint that helps such students to remember parts of their day that they can share with their family. Upon completion of recounting the GABs the student can receive points. Although the intent is to use a small number of words as a reminder the system can also accept pictures and short videos or GIFs that can either accompany the GAB or be the GAB. If a GABs is going to be shared with the entire class, the should be relevant and meaningful for all the students to recount the situation.

The GAB entry user interface 900 may be configured to meet a teacher's specific needs. The communication system may enable teachers/leaders to create new formats, layouts, and styles via a teacher user interface to meet the specific GAB and communication needs for their class or for individual students. For example, a teacher/leader may configure the GAB entry page for their student(s) to add more or less GAB entries, to add a calendar feature, to add space for notes, to add space for reminders, etc. The user interface may comprise a design tool that is accessible only by users designated as a teacher/leader/administrator that enables format and layout changes to that teacher's GAB format. These forms can be shared, traded or sold via the communication system presented herein Market or on other websites where teachers share ideas, tools forms, etc. for free or for purchase (e.g. Teachers Pay Teachers).

Students may also be provided with design tool options at a dedicated student user interface that enables the student to update the look and scheme of their GAB entry user interface, e.g., by adding colors, logos, pictures, quotes, designs, etc. to make the student's user interface relevant to the class or school dynamic. Students may also be presented with selections to update their Parent's user interface with similar editing capabilities. The changes may be applied to the user interface that displays the GABs to the parents. Students may be able to redeem points from their GAB bank to make these updates. They may use points earned through use of the communication system to "buy" pictures, quotes, decals, icons, etc. that personalize their GAB entry user interface or their parent's user interface. With a premium membership that can add cartoons, stories, comics etc. daily so after they finish reviewing their GAB report with the family they can see what they signed up for. Students can make their entry user interface and their parent's report user interface their own that fit with the family dynamic.

In FIG. 8, after the student GAB entry is received in the communication system, the GAB may be delivered to the teacher's user interface. For example, once the student has entered three GABs or pictures or videos, and clicks on the submit button, the GABs are delivered to the teacher for review. Once the GAB(s) are submitted, the student cannot change the GAB(s). The GAB(s) may be available to update or modify by the student at a later time, e.g., the next day after school starts. The school start time can be set by the teacher, which provides for the GABs to be reviewed between Student and Parent over breakfast. After entry of the GAB in class, the GAB account can be locked to students until the next school day begins. For example, only the teacher might be able to edit the GABs between when they are submitted to the teacher and the next school day.

After delivery to the teacher/leader via the communication system, the teacher may review and/or edit the student GAB. The teacher/leader may also enter their own GAB or other notes for a class, for a subject, or for a particular student. The teacher can receive notification that the Student GAB(s) are available for review via a computer for smartphone. To be sure that what the student(s) has entered meets the criteria of a Student GAB and may be appropriate for consumption by the student's parents and possibly other parents subscribed to the Teacher Feed, the teacher reviews the Student GAB(s) and edits as necessary via a computer or smartphone. Once the teacher may be prepared to submit the Student's GABs they push the submit button and send the GABs to the communication system database.

The teacher can set reminders in the communication system to review the student GABs after each class or at the end of the day or particular times. The communication system may send a note/reminder to the teachers phone, tablet or computer or all based on Teacher's set up of reminders. In addition, if the GABs are not submitted to the communication system by a set time limit, e.g., the end of the school day, a reminder may automatically be sent to the teacher on their smartphone, text or phone call to remind them to review the student GABs, edit, submit and provide their own GABs. The teacher review may ensures the GABs are appropriate for parent consumption and meet the criteria of a GAB.

In addition to reviewing student GABs and submitting those GABs to the communication system database, the teacher/leader may submit their own GAB to the system. The teacher GAB may provide the student with something to discuss that the teacher believes can encourage a meaningful conversation between student and parent: class, school, town related or a current event that the child can understand and or remember from the day and can be a start to a meaningful family conversation. The GAB can relate to any topic or subject the teacher may like to enter. The student generally may not know nor has seen this GAB until the parent opens the parent user interface and provides the child with the list of GABs to review, but the student should be able to remember or relate to the GAB.

Teachers may also send messages to a child's parent(s). In a separate section of the communication system there can be the ability for student or teacher to enter descriptive sentences or other communications to inform children or parents of the child's progress, missing assignments or other related information. Only the parents in a group or section that the teachers wanted to see the message can see these messages. The teacher can also designate which parent sees which message. The Teacher can also send a message directly to a specific parent via the communication system presented herein. These may not be available to nor be seen by the larger population who has subscribed to the teachers feed. These messages could be submitted separately to the individual parent account(s) that needed to received the information regarding the child. Teachers can use this medium to send proactive notes, notify parents of awards the children earned that day or during the week or to provide constructive ways the child and improve during the day.

Teachers can send classroom wide messages to all parents subscribed to their feed. If the teachers feels the need to communicate about classroom behavior, provide study suggestions, provide a class wide update they can via the communication system presented herein. If the students wish to share a reminder, note about a class project, school event, something to wear or bring to school, birthday notification, etc. they can share with their class via the communication system presented herein.

Once the teacher submits the student GABs and any additional notes or entries to the communication system database, a notification may be sent to the corresponding student's parent indicating that a GAB report is available for viewing by the parent. The notification can be an alarm or notification that can be displayed on a smart phone, tablet computer or via text or automated phone call that notifies the parents that the GAB report may be ready to be reviewed and discussed with their child at the appropriate time. This enables the parent to be aware that the GABs are available and ready to be reviewed with their child. In the event of an individual note to parents the parents may receive the notification the GAB Report can be available and an additional notification that an individual note may be available for the parent to review about their child.

In response to receiving the notification, a parent may access a GAB report, e.g., at a parent user interface. The GAB report may provide the parent with GABs from their child and/or GABs or notes from their child's teacher. The parent that initiates the GAB conversation can provide their child with an electronic version of the GAB Report for that day via an app on a smart phone, tablet or computer or a printed version for the student to review. The GAB Report can be printed from a smart phone or computer to a standard printer or a GAB Printer on the dinner table.

However, if a parent has missed several nights of GAB reports they can pull a summary for the previous x (any number—self defined) days of GABs. This GAB report can be a list of all the student and teacher and leader GABs from the previous school week or a designated set of GABS from days chosen by the parent. GABs can be identified as reviewed previously or not. If the parent chooses this list can be scrambled at the push of the scramble button. The GAB Report can be printed from a smart phone or computer to a standard printer or a GAB Printer on the dinner table. Read only access may be provided to other establishments such as restaurants so that copies of a family's report can be printed at the restaurant. With the child's teacher's name, school and state required for log-in, the restaurant or establishment can log into the communication system presented herein and print up the report for that teacher from that day (other day if requested by parent). Another option may be the parent can use a mobile application for the communication system that automatically connects with a GAB Printer at the establishment and prints the GAB Report. The parent can tell their server they have printed the GAB Report and the server can deliver it for a fee determined by the establishment. The report can be printed from the GAB Printer and may have the parent's name and teacher's last name as identifiers.

In order to maintain the student's level of interest in communication prompted by the system, features may be provided through the system that involve games or that prompt games using GABs. For example, parents and students can determine how GABs are to be presented by the student. They can choose from a number of presentation methods or styles. They can request that the communication system present to scramble the order for each GAB to be presented in any of the following ways. Scramble can be chosen and the communication system presented herein can signal which GAB may be presented in which manner.
  a. Conversation
  b. Charades
    i. Student acts out the GAB with no talking
  c. Singing
    i. Student sings the GAB
  d. Jeopardy
    i. Student leads with questions for the family to determine what the GAB may be about
  e. Drawing
    i. Student draws what the GAB may be about and parents guess on what it may be about The GAB system can also include additional games, apps or other ways to make the family dinner table more full of parent child communications. An app store can be available for developers to create games and apps that utilize the GAB(S) as part of their app data and presentation. Additional apps that may create more conversation and support parent child interaction may be available too.

In the event the parent has received an individualized message from the teacher regarding their child, the parent(s) are able to decide to include the note in the GAB Report or not include it in the GAB Report and keep separate. The parent can store this note in their account separately from the GAB reports for retrieval at a later time.

Figure 10:
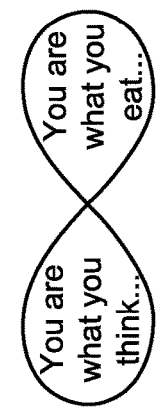
FIG. 10 is an example user interface in an example communication system in accordance with aspects presented herein.

FIG. 10 illustrates an example user interface 1000 having an administrator's entry 1002, e.g., a principal's entry. This entry may be connected with each student's report for the principal's school. Similar to a teacher, an administrator may also have the ability to send an individual message to a particular student/parent.

Once the parent pulls up the GABs, the parent is provided with information to prompt the student to present each GAB individually to their parent(s) with general conversation or via the formal outline of a story character, setting, problem and solution or in a general description. The game options for the GAB discussion can be indicated in the GAB report. This provides the opportunity for the child to initiate and lead a conversation about something that took place during their day without prompting or inquisition by the parent, but a time specifically carved out for the child to describe a part of their day leveraging the GABs. Students may be motivated by knowing that they may be awarded points based on their ability to recount the event and describe it so the parents can get a window into the child's day through conversation vs. question and answer session.

Figure 11:
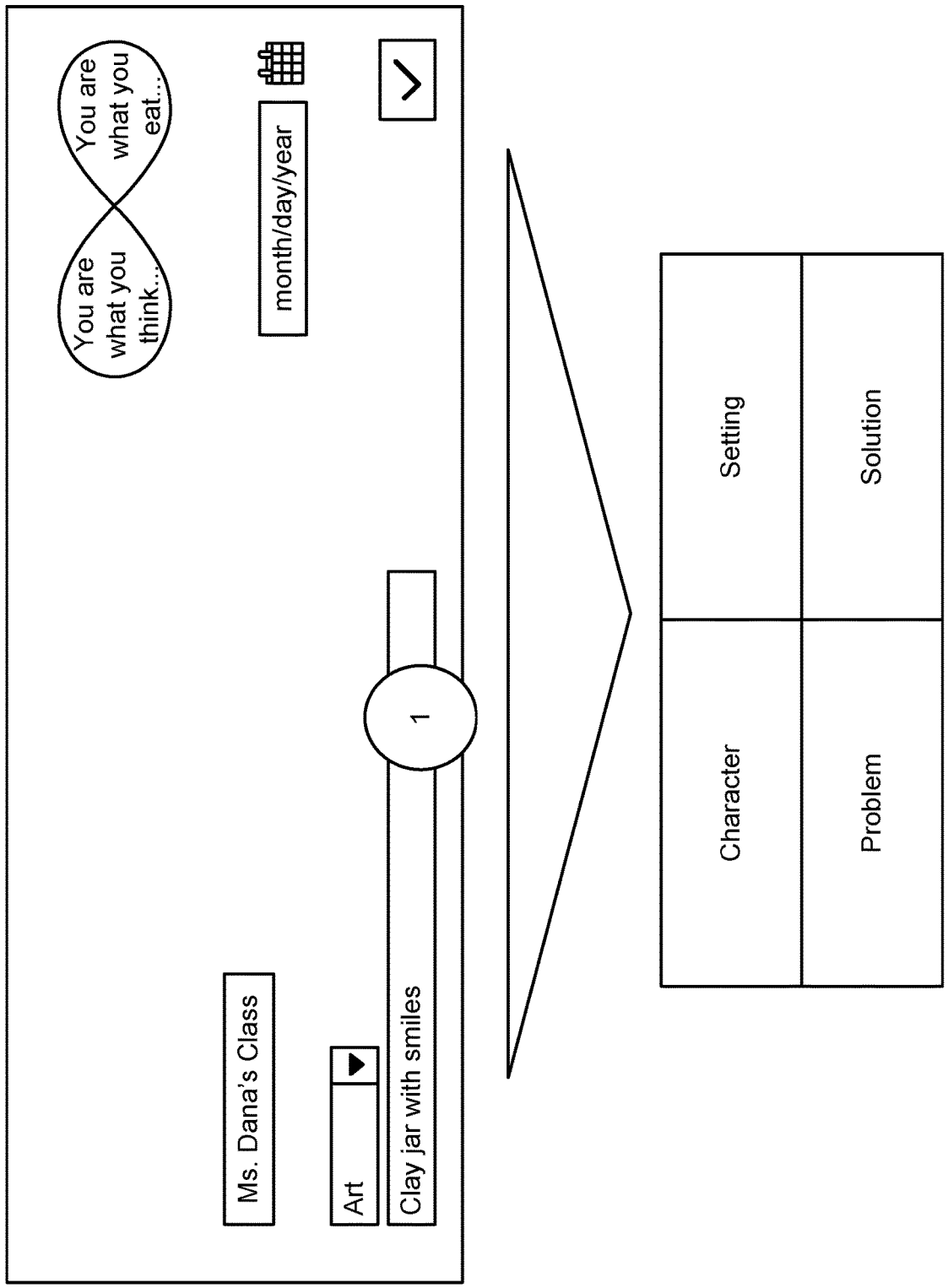
FIG. 11 is an example user interface in an example communication system in accordance with aspects presented herein.

FIG. 11 illustrates a GAB game user interface 1100 that may be presented to the parent as a way of viewing the GAB report. In the game in FIG. 11, the parent can push the GAB Button and 4 squares may pop up displaying the key pieces of story that they can follow to communicate the story to parents.

The student can initiate a conversation or story leveraging each student and teacher GAB. This can be a core step in the "Student-in-the-Loop Communications" process that provides their parent(s) with a window into their child's day. Based on the need for the student to be aware of the events and activities and topics that take place during the classroom so they can recount the GAB(s) they are demonstrating greater attention and awareness during class. They are also able to exercise their working memory and gain confidence in their ability to remember their day. Most importantly the parents and children are connecting over the child's day. Testing may be conducted to explore the impact this general, everyday conversation may have on the child parent child relationship and the child's performance in school as well as socially and potential impacts to physical and mental health and well-being.

The child has provided their parent with the details related to the event along with context, perspective and their opinion of the situation. The parent begins to get a "window into their child's day." Ultimately a conversation has been sparked and opened about an event(s) the child witnessed or took part in during the day. The window into the child's day provided by the child describing and providing context of each GAB promotes healthy conversation during dinner. The science describing the benefits of family dinner conversation is abundant and how it fosters strong, confident children that perform better in school, socially and in other activities. There is evidence that dinner conversations greatly reduce the risk the child may engage in illicit drug, alcohol, and tobacco use and other activities.

The student introduction of the GABs leads to parent/child conversation. The parent and child can be provided a catalyst for opening and continuing a conversation about the child's day. The child can initiate and can lead the conversation based on events he/she knows about, can relate to, and are directly connected to a reward of points for completing the conversation.

An option for parents when using a smart phone, tablet or computer the parent can use the GAB Story Board option, illustrated in FIG. 11, by clicking on the GAB and a list of 4 key elements of a story are displayed along with the GAB so the child can be guided through the process of building a classical story with the character, situation, problem and solution. Each section the child addresses appropriately the parent tabs that section and a point can be awarded for providing the character, situation, problem or solution. The GAB Story Board can also be updated by the teacher to meet their teaching style and the child's/class abilities.

The parent and child are able to have conversation about the child's day initiated by the GAB(s). Although performance and progress may be part of the conversation, more general "fun" and "light" conversations are meant to provide an opportunity for the parent to know some of what their child may do during the day and to help foster a connection and narrative of the child's experiences during the day. With the GAB as reminders and hints the child can more easily remember the situation and lead a conversation. The parent now has a "Window into their Child's Day."

The student can build a relationship with their Parent(s) through the GAB conversation and at the same time learning about their parents and how to communicate as a family.

Although evidence abounds that a family that eats dinners together sees great benefits to the social, academic, mental and physical health as a child grows, the dinner table may be becoming less of a central place for families to meet and connect. Parent's work and related schedules are full; children's are involved with school, sports and other activities so eating together around the dinner table may be happening less. The key to dinner conversation is a family community, connection and open, mutual discussions and fun. The communication system presented herein provides a tool that can be used to foster that dinner table like conversation environment anywhere, anytime.

The Parent can enter a confirmation regarding the review and discussion of each GAB. Each time the discussion of each GAB is completed the parent can push the "GAB Complete" button to confirm it was discussed with their child, and a point can be assigned to the student, class, teacher, school and parent. If the parent uses the GAB Story Board option each time they push one of the story elements a point can be recorded for the child, parent, teacher, class and school. This record enables the student and family, class and school to accumulate points. The points can be tracked and banked so the child can redeem the points for redemption opportunities at school and home (redemption options for school, home and other activities that can be available) or via a Market provided within the communication system. Redemption can also take place with other venues such as sports, art, theater, music, academic, clubs or activities. The points can be used in competitions between students, classrooms, schools, districts, states etc. The points can also provide status, rank and measurement related to their peers in class, school etc. The status can be similar to ranks that child can earn based on the points accumulated. The child may be motivated by the opportunity to accumulate points to ensure GABs are provided by the teacher and discussed with parents and points submitted. This ensures that the GAB system works and the parents continue to get a window into their child's world.

In addition the confirmation of GAB review/discussion provides reporting data that the teacher can use to demonstrate their communications with the parents and students. These reports can be used in research to better understand the impact and usability amongst other opportunities of the "student-in-the-loop communication" and other related research to enhance the educational opportunities of children and the family dynamic as it relates to school engagement.

The communication system presented herein provides through a computer based tool, an artificial means of creating external sources of motivation at the point of performance in the context in which the work or behavior is desired, the importance of which is described for treating those with EF deficits in *The Important Role of Executive Functioning and Self-Regulation in ADHD* © Russell A. Barkley, Ph.D., http://www.russellbarkley.org/factsheets/ADHD_EF_and_SR.pdf.

As an additional aspect, teachers may receive a credit within the communication system for their effort to communicate with the parents via the children. Data may be collected using a reporting tool to research and to identify opportunities to enhance the Communication system presented herein to help facilitate the "Student-in-the-loop-communications" and provide parents with a window into their child's world.

Each GAB reviewed can be noted by either pushing the GAB or hitting the submit button. Each time the GAB button can be pressed and the 4 point outline of a story can be presented—those points can also recorded by the parent pressing the point to signal the child recounted that part of the story. This record enables the student and family, class and school to accumulate points. The points can be tracked and banked so the child can redeem based on their interest with redemption opportunities at school and home. Redemption can also take place with other venues such as sports, art, theater, music, academic, clubs or activities. The points can be used in competitions between students, classrooms, schools, districts, states etc.

In addition the record of GAB use provides reporting data that the teacher can use to demonstrate their communications with the parents and students. These reports can be provided to school administrators to be used to score the teachers against specific goals and objectives for communicating with parents and students. These reports can also be used in research to better understand the impact of "student-in-the-loop communication" on students, parents, classrooms and teachers and other related research to enhance the educational opportunities of children and the family dynamic as it relates to school engagement.

When a Parent records the use of the system and the GABs reviewed, reporting information may be automatically collected at a reporting portion of the communication system. The reporting portion may be provided to teachers and administrators, as well as others. A report per teacher may be processed and made available through a user interface at the communication system or other method of reporting. The report may indicate the number of GABs sent out to parents by a teacher per day, per week, per month, and per year. The report may indicate whether the GABs were teacher entered or student entered. The report may indicate the number of times the parent user interface was accessed, and/or a number of times that a "read" indication was submitted for student/teacher/leader GABS. Accumulated points may be tracked for individual students, as well as groups of students. Students may be grouped by family, by teacher, by school, by coach/leader, by points segmentation, etc. The Points segmentation of students may track only the school GAB tallies, for example.

Market sponsors can also provide products and services to the students for point redemption (e.g. offering electronic products, books, access to professional sports players, memorabilia, or games, etc.) Points accumulated in the communication system may be cashed in via a user interface at school, at home, etc. The points may be debited from a child's account. For example, a points redemption button may be provided at the student's user interface. In one example, when a student selects the button, a notification may be sent to the student's parent via the communication system prior to allowing the student to redeem their points. A parent may be required to confirm any of: that the student's account may be debited, a number of points that may be debited, etc. A confirmation notification may also be provided to a teacher. For example, a notification may be provided to the teacher asking which students have redeemed points. Teachers may have an option to debit by class or by student. Redemption ideas can be provided, e.g., chores, responsibilities, bad deeds, good deeds, etc. An ongoing tally of points may be maintained for an amount of time, e.g., for a school year and reports may be reviewed based on groupings by student, family, teacher, class, school, school district, etc. Based on points accumulated various levels of achievement, honor and leadership can be earned by students, teachers, families, schools, school districts, etc.

Figure 12:
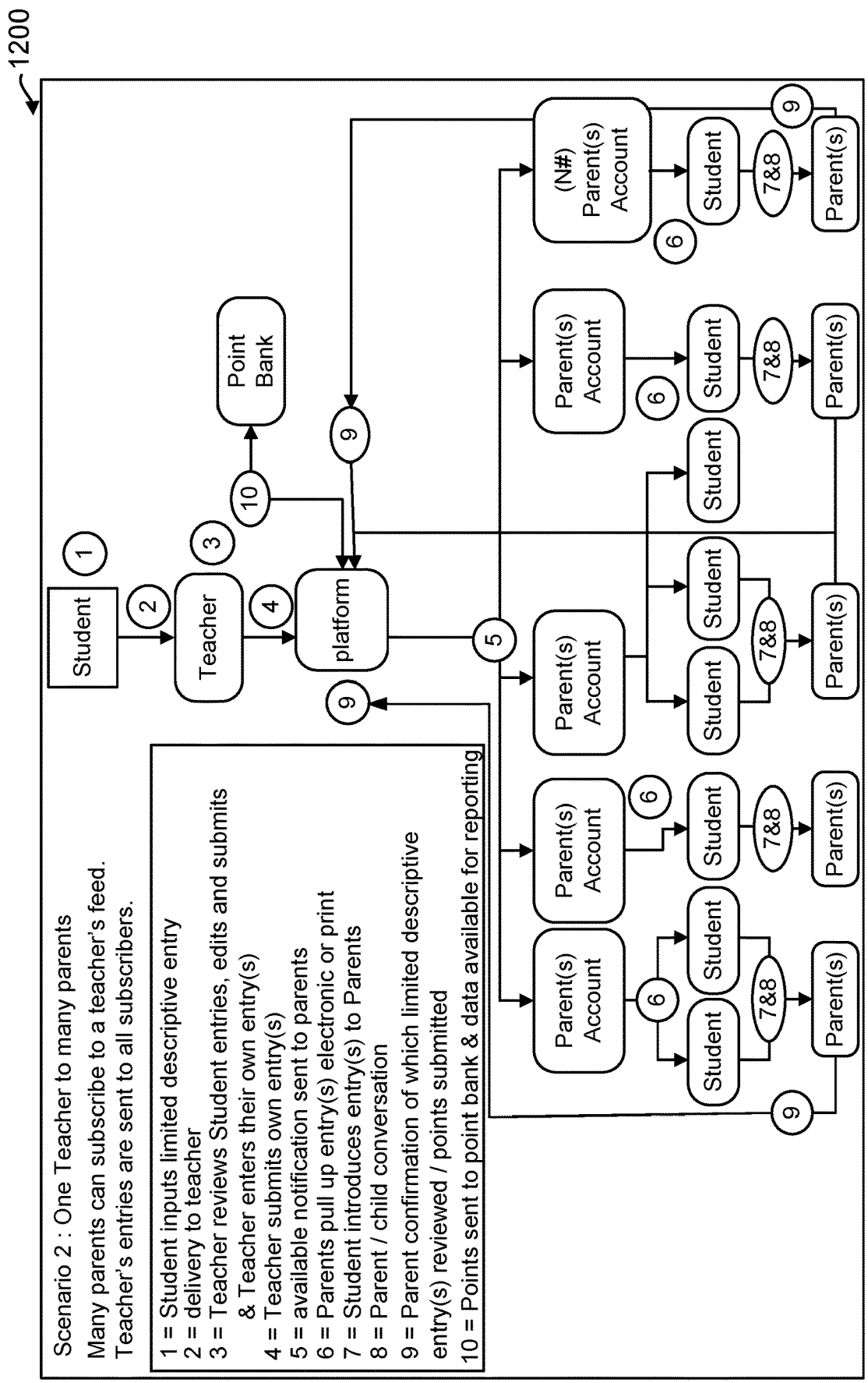
FIG. 12 is an example communication flow diagram for an example communication system for a single teacher and multiple parents in accordance with aspects presented herein.

FIG. 12 illustrates an example flow of communication 1200 for an example involving communication from a single teacher for multiple students/multiple parents. The student input for each student, the GAB delivery to the teacher, the teacher review, and the teacher submission of GAB/notes is similar to those in FIG. 8. The communication system presented herein can offer a one to many model as illustrated above for the delivery of GABs. The teacher in each class can assign one or more students with entering the GABs each day for that class. Whether it's one child or more that are responsible for that days GABs the total entered for each class each day can typically be three unless otherwise reformatted by the teacher. The teacher can add their GAB to the communication system presented herein (or more if reformatted by the teacher). These 4 GAB's entered are now available for anyone who has subscribed to that Teacher's Feed. With so little description in a GAB it should mean nothing to anyone but the children in the class who experienced or witnessed the GAB during the day. So anyone who subscribes to the teacher's feed can be notified of their availability of the GAB. It could be a class of 1 or 30, but any number can subscribe to the feed and receive notification of the availability of the GAB(s) and be able to down load the GABs. Thus, the teacher can communicate with all the parents via the GABs they approve for the students and via the GAB they enter. A teacher may take 30 seconds a day to provide notifications to parents.

When the parent(s) have multiple children that use communication system presented herein and they can review together as a group, such as at dinner, they can choose to review the GAB Report with different variations. The parent may select an option to review one Child's GAB Report at a time. Alternatively, the parent may select an option to review multiple children's GABs together. A scramble option may be provided to scramble the GAB Reports for all the children. The communication system may put the GABs in random order by child and can ensure each child has a turn to tell their GABs. This can allow the family to all be engaged in the dinner conversation throughout the dinner.

When a parent logs in to the communication system or opens an application in communication with the communication system, the parent may be provided with all the children's names associated with their account. The parent may review only one child's GAB Report at a time, e.g., by selecting that child's name, their GAB report may be presented to the parent. The report may be presented either visually or sent to a printer. Parents can also select a combined view of GABs for multiple children, which may similarly be presented visually or printed as a report. The order of the GABs may be based on grade level or may be configured to be random. Parent can press the scramble button and each child's GABs can be listed in a random order. For example, upon pushing scramble, the order may be GAB # for child 1, GAB #x for child 2, GAB #x for child 3, GAB #x for child 2, GAB #x for child 3, and GAB #x for child 1. The random order may be used for visual presentation or for printing reports in random order.

The student introduction of the GABs, the parent/child conversation, the parent confirmation of review, points reporting, and reporting may function similar to the discussion for FIG. 8.

Figure 13:
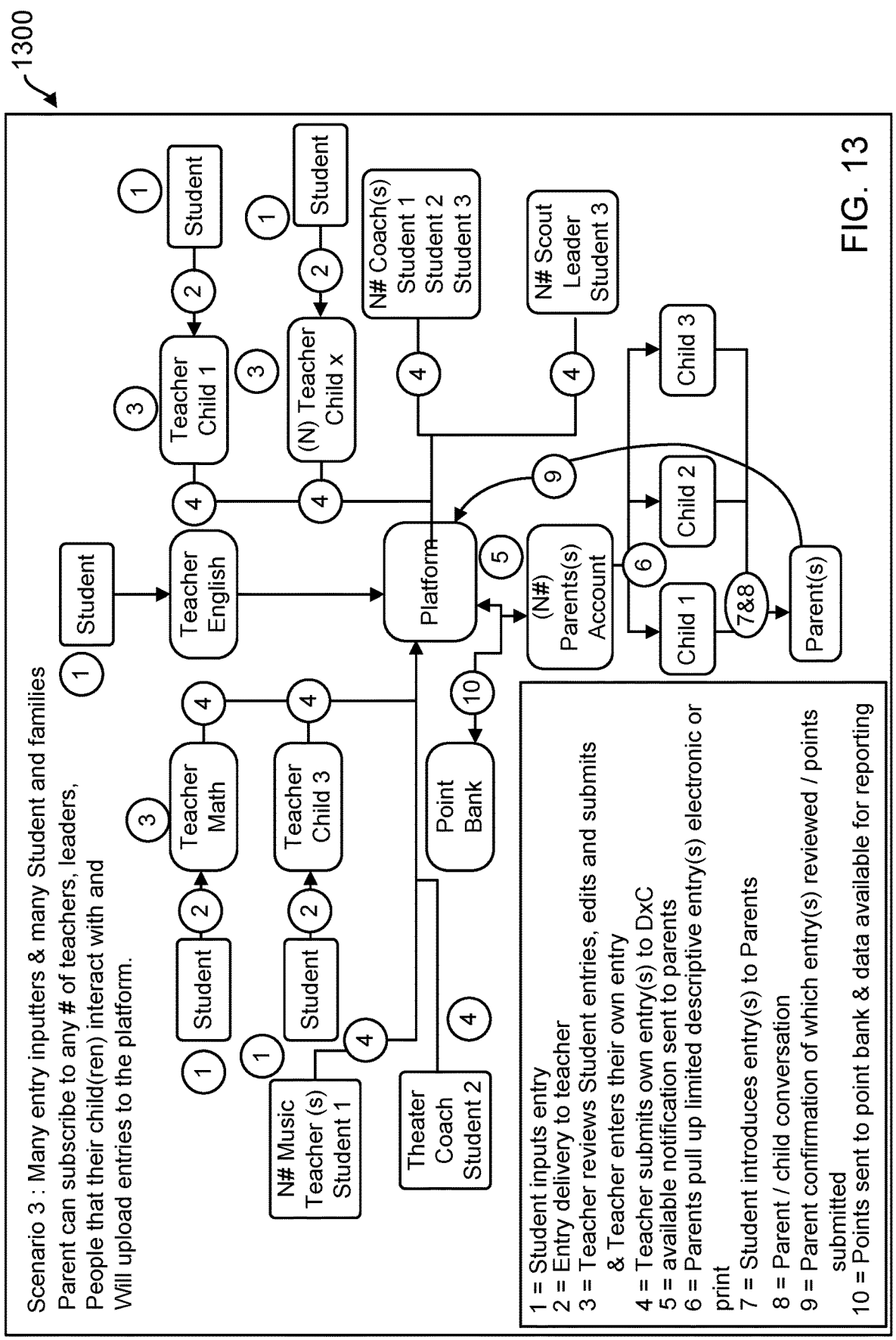
FIG. 13 is an example communication flow diagram for an example communication system for a multiple students within a family in accordance with aspects presented herein.

FIG. 13 illustrates an example communication flow for parents to receive communication for each of their children in an order they wish or determined by the communication system platform. A Scramble option may provides the parents a way to hear each child's GABs in an order determined by the communication system platform enabling all the children to review some GABs during the allotted/available time of the family being together. The student input, GAB delivery to the teacher, teacher review/submission, and parent/child conversation may function similar to the description for FIG. 8. In FIG. 13, a parent may have several children subscribing to many GAB feeds. As the student moves through grades in school they typically can move beyond having just one teacher. Each teacher the student comes in contact with via class, sport, art, music, topic (science, math, language arts, social studies, health, gym, etc) can have a student enter one GAB and then the teacher enter their own GAB or enter both GABs depending on the child's ability and the availability of technology based on the class location and set up. Parents can sign up to receive the GAB feeds of any teacher the student comes in contact with—as long as the teacher provides the GABs. If a parent signs up for more than one teacher, the GAB options may be different. For example, a primary teacher may be provided a set number of GABS, e.g., three GABs, while additional teachers may be provided a limited number of GABs, e.g., 1 GAB. If the parent signs up for more than two teachers, the report may include a student GAB and a teacher GAB for each teacher to which the parent subscribes. The parent may receive a limited number of GABs for each teacher to which the parent subscribes. For example, the parent may select, or the communication system may automatically limit the parent to receiving a single student GAB and a single teacher GAB for each teacher to which the parent subscribes. Other limited numbers may also be used.

There are other leaders that the child may interact with during their day other than their teachers at school. Each of these leaders can contribute to the GAB for that child. If these leaders are part of the communication system presented herein so that parents could sign up to receive feeds from this leader as well. Examples of the other leaders could be, After School Programs, Day Care leaders, Pre-School teachers, Boy or Cub Scout Leaders, Sports Coaches, Music Teachers, Tutors, Theater Leaders, etc.—anyone that leads a portion of the child's day. For each additional leader that a parent subscribes to they may receive one GAB and the GAB report can contain that GAB. The GAB report can include the student, teacher and other leader's GABs.

A parent may adapt a GAB report to best fit the needs of the parent.

Figure 14:
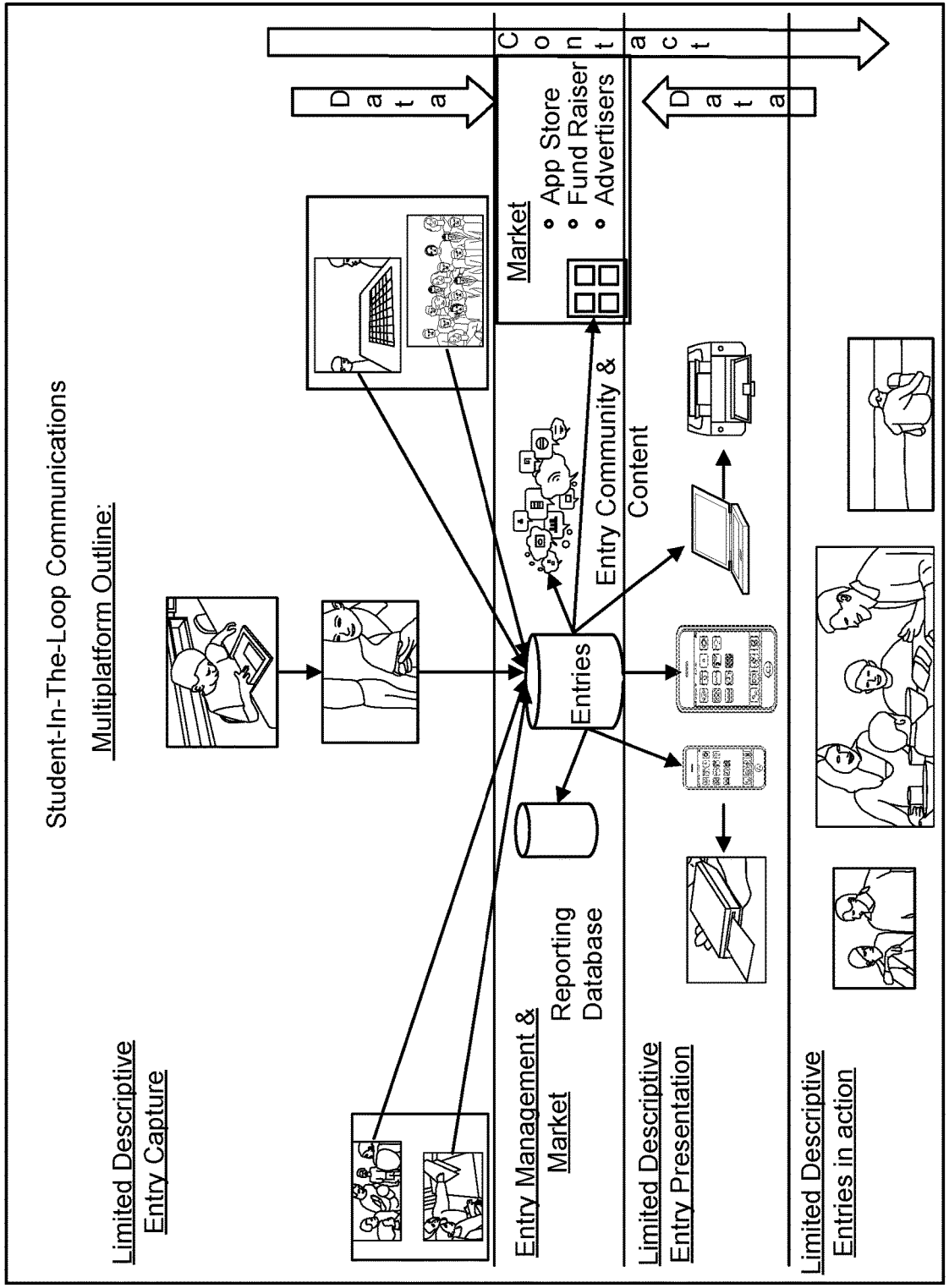
FIG. 14 is an example diagram of components of a communication system in accordance with aspects presented herein.

FIG. 14 outlines an example pictorial description of the GAB flow from student to teacher to database to device onto a parent device, accessed by the child and introduced to the family and a family conversation follows. The GABs are central to the communication system presented herein and enable the "Student-in-the-loop Communication" to take place. The objective of the student-in-the-loop communication using GAB(s) is to provide a tool that can provide parents with a "window into their child's world" by using the GABs as a catalyst for conversation that can provide details insights and opportunities for communicating beyond just reporting the facts. The intent is that the communication system presented herein can enable and promote dialogue, connection, insights and ultimately a better connection between parent and child and between child, teacher and school.

FIG. 14 illustrates examples of the GABs community and the GABs Market. FIG. 14 illustrates that GAB information may be received from students, teachers, leaders, etc. and may be communicated to a central GAB database. The central GAB database may include a reporting database. The central database may collect and store user accounts for different types of users, e.g., students, teachers, parents, etc. and may provide access to the communication system via a corresponding user interface for the different types of users. The central GAB database may receive and store connections between the different types of users so that students are linked to the corresponding teacher(s) and parents are linked to the corresponding child and teacher(s). The central GAB database may receive GAB input. The GAB input may trigger an indication to be sent to the corresponding teacher to review the GAB input. The central GAB database may receive a GAB submission/approval from a teacher that may trigger an indication to a parent regarding the availability of a GAB report. The central database may format and provide a GAB report to the parent. As illustrated in FIG. 14, the GAB presentation may be provided to various different devices, e.g., wireless mobile devices, computers, printers, etc. The GAB report may be provided via a mobile application at a mobile device, via e-mail, via text, via the internet, etc.

The GAB Community can enable targeted data to be communicated between parents and between teachers across the communication platform: within a class, school, district or across anyone on the platform. The GAB Market can enable the trading, purchase and sale, with actual dollars or via points, depending on those involved (teachers, parents, students) and what kind of transaction may be taking place. Teachers or schools can purchase new formats for the GABs for real dollars or the students can exchange points to support causes of other students. In addition the market can support the purchase and sales of apps provided by developers along with other games that are provided by developers or merchants. In addition sponsors can provide access to products and services to students, teachers and parents for sale with actual dollars or leveraging the collection of points.

The Communication system may enable sponsors and advertisers to include an advertisement on the GAB report. In another example, sponsors may sponsor contents for specific class, school, schools, district, state, etc. and leverage the points generated from communication system to determine rank of success. Products or services may be used as a form of sponsoring such competitions, e.g., offering computers, books, ice cream, access to sports memorabilia, sports teams, celebrity sports people. Students and teachers may redeem points stored in the communication system for products or other rewards provided by sponsors.

Each type of user, may be able to log into their version of the communication system, e.g., a personalized user interface for the corresponding type of user, via the internet or via a mobile device application. Types of users may include, among others, teachers, students, parents, leaders, coaches, administrators, etc.

In order to sign up and create a profile at a central communication system database, a teacher or leader may create a username and password. Drop down or other types of selections may enable the teacher to enter identifying information, e.g., including name, school, grade, state, town, class, subject, activity, sport, league, level, age range, gender, etc. that may assist parents in finding and linking to that teacher's feed so that the parent can receive the teacher's GAB reports. A Gab report can automatically be created for each teacher that is specific to them. The user interface may enable the teacher to make selections to adjust the GAB report format by performing any of: increasing/decreasing a number of GABs provided for the teacher, adding additional areas for notes/dates/reminders/etc. that may be edited by the teacher and/or student. The GAB report may be individualized by the teacher for a class, for a subject, or for an individual student. Similarly, the GAB report may be individualized by a student. The teacher may set up login information for students in their class to enter GABs. The teacher may share the sign in information with their students. Once the students submit a GAB the communication system may restrict the student from editing it until the start of the next school day, e.g., only teachers might be able to edit the GAB after the Student enters and submits it. Students may be able to update the GAB entry screen with skins, logo's etc. down loaded from the communication system presented herein or imported from other sources. A premium account type may be offered that enables students to have cartoons, comics, stories, and related content added to their family GAB report, e.g., on a periodic basis such as daily.

A teacher may set a GAB reminder at the teacher user interface by setting a time of day when the teacher may like a reminder to enter GABs. Multiple reminders may be set for each day, e.g., for 3 GABs, different reminders may be set at different times of the day. Alternatively, a single reminder may be set for a single time in a day to remind the teacher regarding all three GABs at once. The reminder may be triggered if the corresponding GAB has not been entered, has not been reviewed, etc. For example, if no GABs are entered, the teacher may receive a reminder to review the student submitted GABs and/or to submit their own GABs. The reminder may be sent by the communication system via a text, phone call, e-mail message, or notification at a mobile application. If the corresponding GABs are entered/submitted by the set time, the reminder may not be triggered. Thus, the teacher will only receive a reminder from the communication system when a corresponding GAB has not been entered, reviewed, or submitted by the set time.

In order to sign up and create a student account at a central communication system database, a student may similarly create a username and password. The student may select the teacher using identifying information regarding any of state, town, school, teacher, class, subject, coach, team, sport, etc. The student account may provide a user interface to access, manage, and redeem points. The student may also be able to update their parent's GAB report page from the student user interface for their student account.

Parents may similarly create a parent/family account by creating a username and password for accessing the communication system. Multiple parents may sign up for their own account and may identify from which teachers they want to receive a feed. Multiple parents/guardians can receive teacher feeds for the same child. Parents can designate which child is to be related/linked to which teacher feed. The connection may be reflected in the GAB report to the parent. The parent user interface may provide an option to scramble the feeds from different teachers and/or for different children. An option may be provided to provide one parent a defined number, e.g., x, of a child's feeds and to provide the remaining feeds to a different parent. The parent's GAB report may present all of the GABs per each child and/or may randomly assign GABs to each parent to review. Parents may select to receive a class GAB or an individual GAB for a designated child. Individual GABs may relate to students with an IEP or 504.

FIG. 1 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, for example in FIG. 3 and as described throughout the application. An example of such a computer system 100 is shown in FIG. 1.

Computer system 100 includes one or more processors, such as processor 104. The processor 104 is connected to a communication infrastructure 106 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 100 can include a display interface 102 that forwards graphics, text, and other data from the communication infrastructure 106 (or from a frame buffer not shown) for display on a display unit 130. Computer system 100 also includes a main memory 108, preferably random access memory (RAM), and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc., which is read by and written to removable storage drive 114. As will be appreciated, the removable storage unit 118 includes a computer usable storage medium having stored therein computer software and/or data.

In alternative aspects, secondary memory 110 may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128, which may be electronic, electromagnetic, optical or other signals capable of being received by communications interface 124. These signals 128 are provided to communications interface 124 via a communications path (e.g., channel) 126. This path 126 carries signals 128 and may be implemented using wire or cable, fiber optics, a telephone line, a cellular link, a radio frequency (RF) link and/or other communications channels. These computer program products provide software to the computer system 100. Aspects presented herein may include such computer program products.

Computer programs (also referred to as computer control logic) are stored in main memory 108 and/or secondary memory 110. Computer programs may also be received via communications interface 124. Such computer programs, when executed, enable the computer system 100 to perform the features presented herein for a GAB communication system. In particular, the computer programs, when executed, enable the processor 110 to perform the features presented herein. Accordingly, such computer programs represent controllers of the computer system 100.

In aspects implemented using software, the software may be stored in a computer program product and loaded into computer system 100 using removable storage drive 114, hard drive 112, or communications interface 120. The control logic (software), when executed by the processor 104, causes the processor 104 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 2:
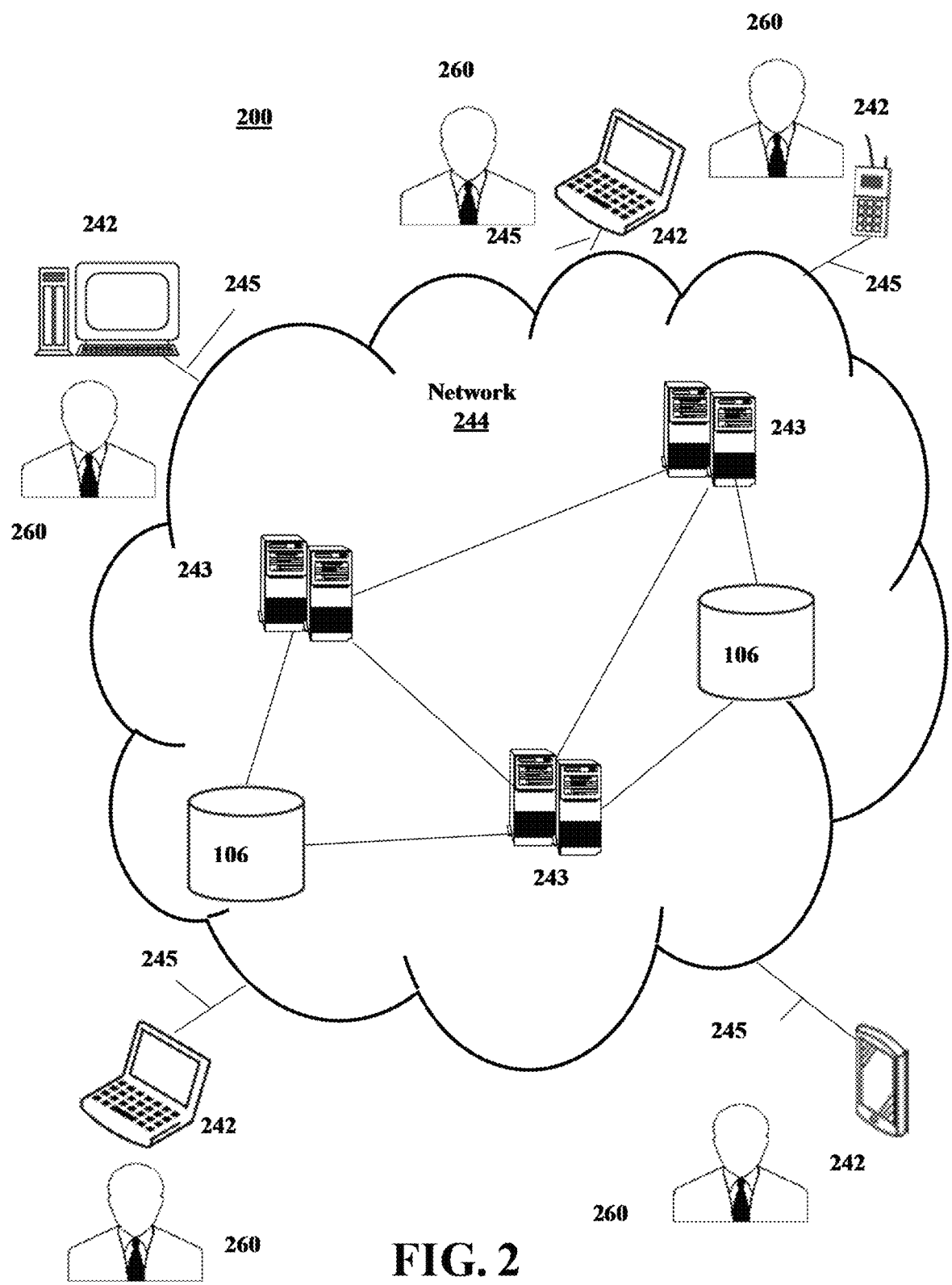
FIG. 2 is a diagram of various example system components, in accordance with aspects presented herein.

FIG. 2 is a block diagram of various example system components, in accordance with aspects presented herein. FIG. 2 shows a communication system 200 usable in accordance with the present invention. The communication system 200 includes one or more accessors 260 (also referred to interchangeably herein as one or more "users") and one or more terminals 242. As described above, different types of accessors may access the communication system, e.g., parents, teachers, students, leaders, administrators, etc. Different levels of access and different user interfaces may be provided for each of these different types of users. In one aspect, data for use in accordance aspects presented herein, for example, input and/or accessed by accessors 260 via terminals 242, such as personal computers (PCs), minicomputers, mainframe computers, microcomputers, telephonic devices, or wireless devices, such as personal digital assistants ("PDAs"), smartphones, tablets, or a hand-held wireless devices coupled to at least one server 243, such as a PC, minicomputer, mainframe computer, microcomputer, or other device having a processor and a repository for data and/or connection to a repository for data, via, for example, a network 244, such as the Internet or an intranet, and couplings 245. The couplings 245 may include, for example, wired, wireless, or fiberoptic links.

Figure 3:
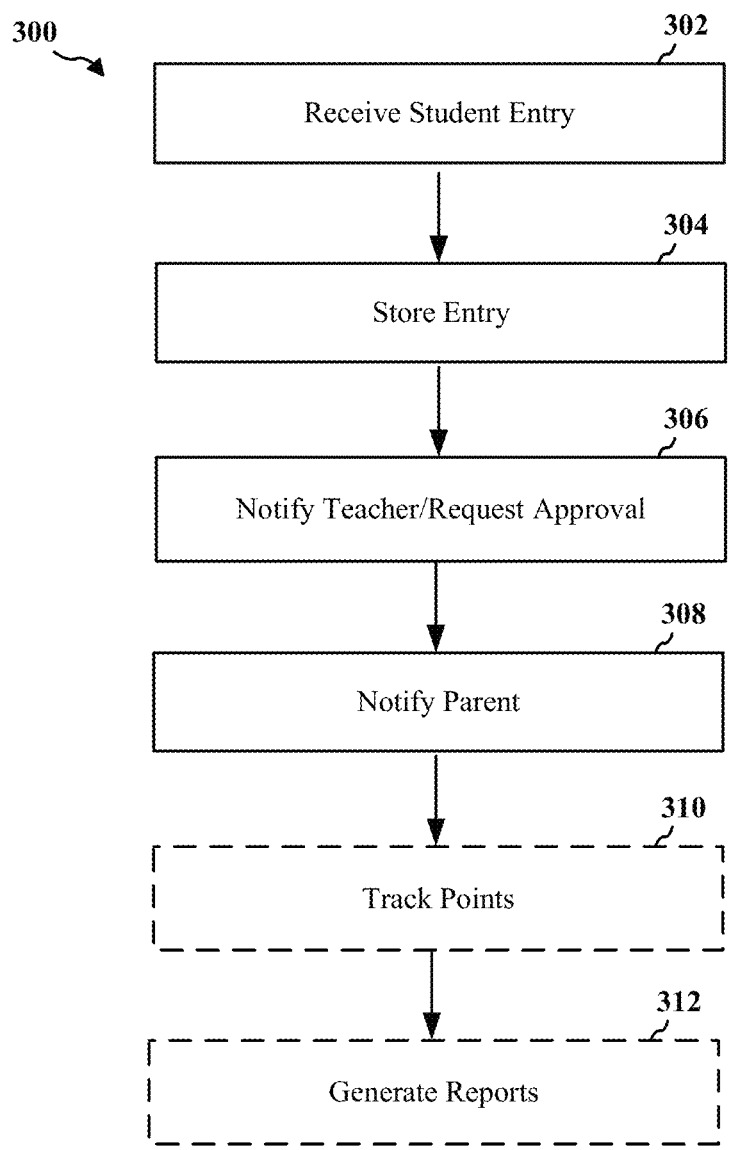
FIG. 3 is a flowchart of a method of wireless communication in accordance with aspects presented herein.

FIG. 3 illustrates a method of prompting student engaged conversation. This method may be implemented via a computer system, such as the system illustrated in FIGS. 1, 2, and 5. The method may be performed at a central processing system (e.g., 106, 243, 514) that communicates with various devices (e.g., 242) in order to gather and automatically distribute communication between teachers/leaders, students, and parents. At 302, the system receives a student entered limited descriptive entry at a first remote terminal. This may include providing a student user interface to the first remote terminal prompting the student to enter the entry, e.g., as illustrated in FIG. 6. The student entered limited descriptive entry may comprise a GAB, as described herein. At 304, the system stores the entry, e.g., in a central database. At 306, the system may send a first notification of the entry to a teacher of the student at a second remote terminal. This may include providing a second user interface to the second remote terminal prompting the teacher to review and approve the limited descriptive entry, wherein the parent is notified of the entry after approval is received from the teacher. The first notification may be automatically triggered by the student entry. At 308, the system sends a second notification regarding the entry to a parent of the student at a third remote terminal. This may include providing a third user interface to the third remote terminal, allowing the parent to access the entry. The second notification may be automatically triggered by the approval of the student entry by the teacher. In another example, the parent notification may be triggered upon the receipt of the student entry.

The first and second notifications may be sent using at least one of a text, a voicemail, an e-mail, a display message, an application operating at a mobile device, or a program operating at the second/third remote terminal.

Aspects may include providing a student user interface to the first remote terminal prompting the student to enter the entry. The student user interface includes a drop down menu with subject matter topic options and an entry component for receiving text for the entry, the entry component having a limited size. The user interface may limit the entry in any of a number of ways, which may be designed to prompt student led discussion. The entry may be limited to less than a sentence, to a maximum number of characters, or to a maximum number of words. The maximum number of words or characters may be very small, e.g., less than ten words, less than five words, between 2 to five words, less than 50 characters, less than 40 characters, less than 30 characters, less than 20 characters, etc. The limits may be selected to provide a hint to the student without describing the event/item to be discussed.

A second user interface may be provided to the second remote terminal prompting the teacher to review and approve the limited descriptive entry, e.g., a teacher entered GAB, wherein the parent is notified of the entry after approval is received from the teacher. A third user interface may be provided to the third remote terminal, allowing the parent to access the entry. The access may be via a GAB report or other way of presenting the entry to the parent, as described herein.

A scramble option may be provided to randomly order a plurality of student entered limited descriptive entries, whether for a single student or a plurality of students. The scramble option may randomly order the entries when presenting them to the parent. An additional option may be provided to present/report entries using any of a plurality of presentation types, e.g., conversation, charades, singing, a game, and drawing.

Additional user interfaces may be provided for administrators, leaders, coaches, etc. The system may further establish links between a teacher account for the teacher, a student account for the student, and a parent account for the parent in order to provide access to the entry.

The system may also track points at 310 and provide a reward system for generating and/or viewing the entries. Therefore, the method may also include maintaining a record of entries by students or teachers and of the amount of entries viewed by parents. The system may also generate and send reports for the teacher, student, parent, administrators, etc. The method may further include the additional steps and functions described throughout this application, e.g., as described in connection with FIG. 4 and FIGS. 6-14.

Figure 4:
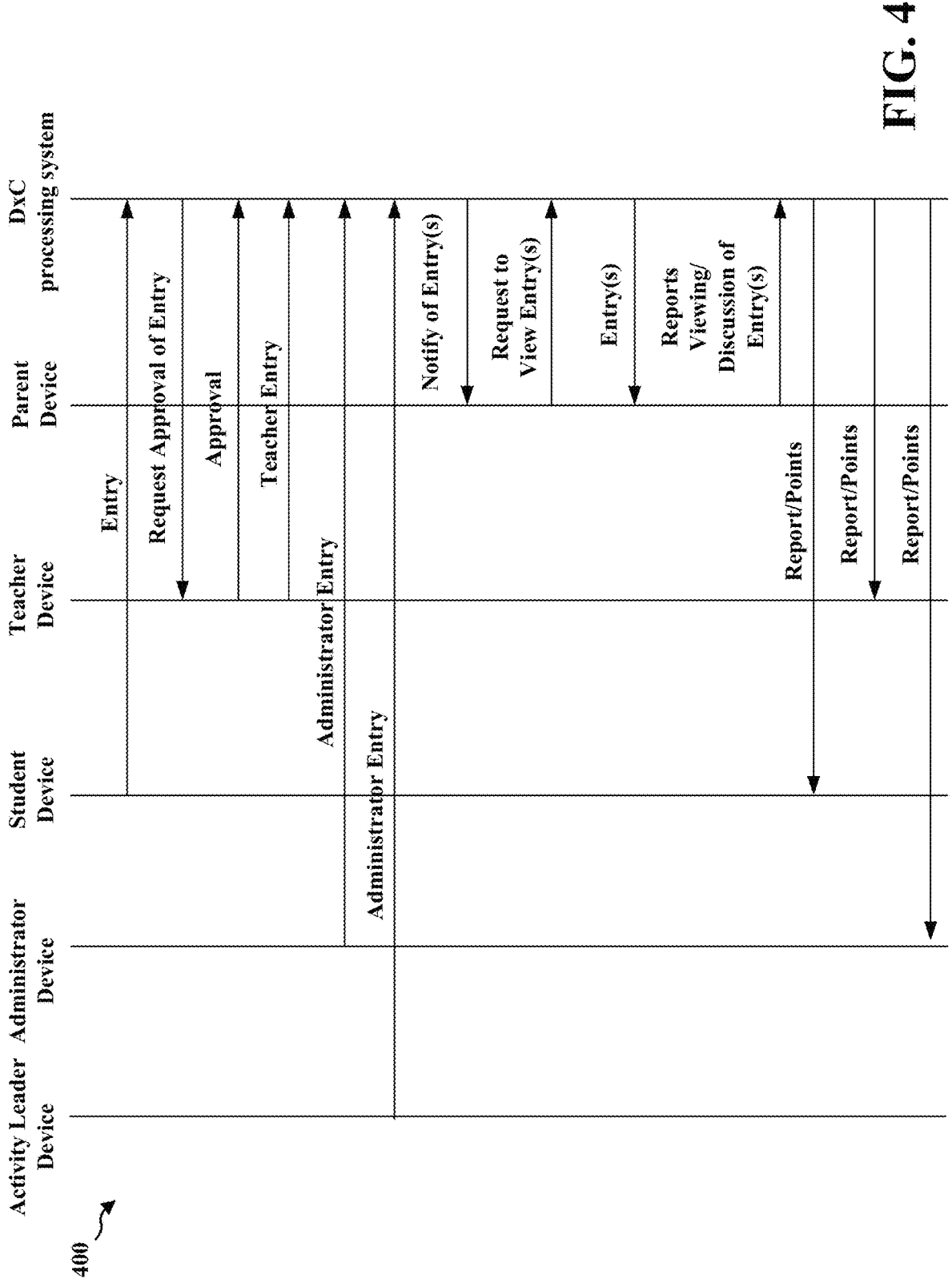
FIG. 4 is a conceptual data flow diagram illustrating the data flow between different accessors in an example communication system in accordance with aspects presented herein.

FIG. 4 illustrates a conceptual data flow diagram 400 illustrating an example data flow between different components within an example communication system in accordance with aspects presented herein. FIG. 4 merely illustrates some general concepts of communication that the system, e.g., 500, may perform in order to perform the functions described herein. Additional aspects described throughout the application may also be incorporated into the data flow of FIG. 4, e.g., as described in connection with FIGS. 3 and 6-14. Furthermore, the communication may occur in a different order. For example, the student, teacher, administrator, and activity leader may transmit their entries to the processing system in a different order than the one illustrated. Furthermore, although only a single notification is illustrated as being sent from the processing system to the parent device, the parent device may receive multiple notifications, e.g., an individual notification corresponding to each of the entries intended for the parent. In a different example, a summary may be sent that includes each of the entries intended for the parent. Although FIG. 4 illustrates only a single parent device, teacher device, administrator device, etc., it is demonstrated throughout the written description that the processing system may be configured to link multiple teachers, leaders, and administrators to multiple parents, based on the connection to each of the parent's students.

Figure 5:
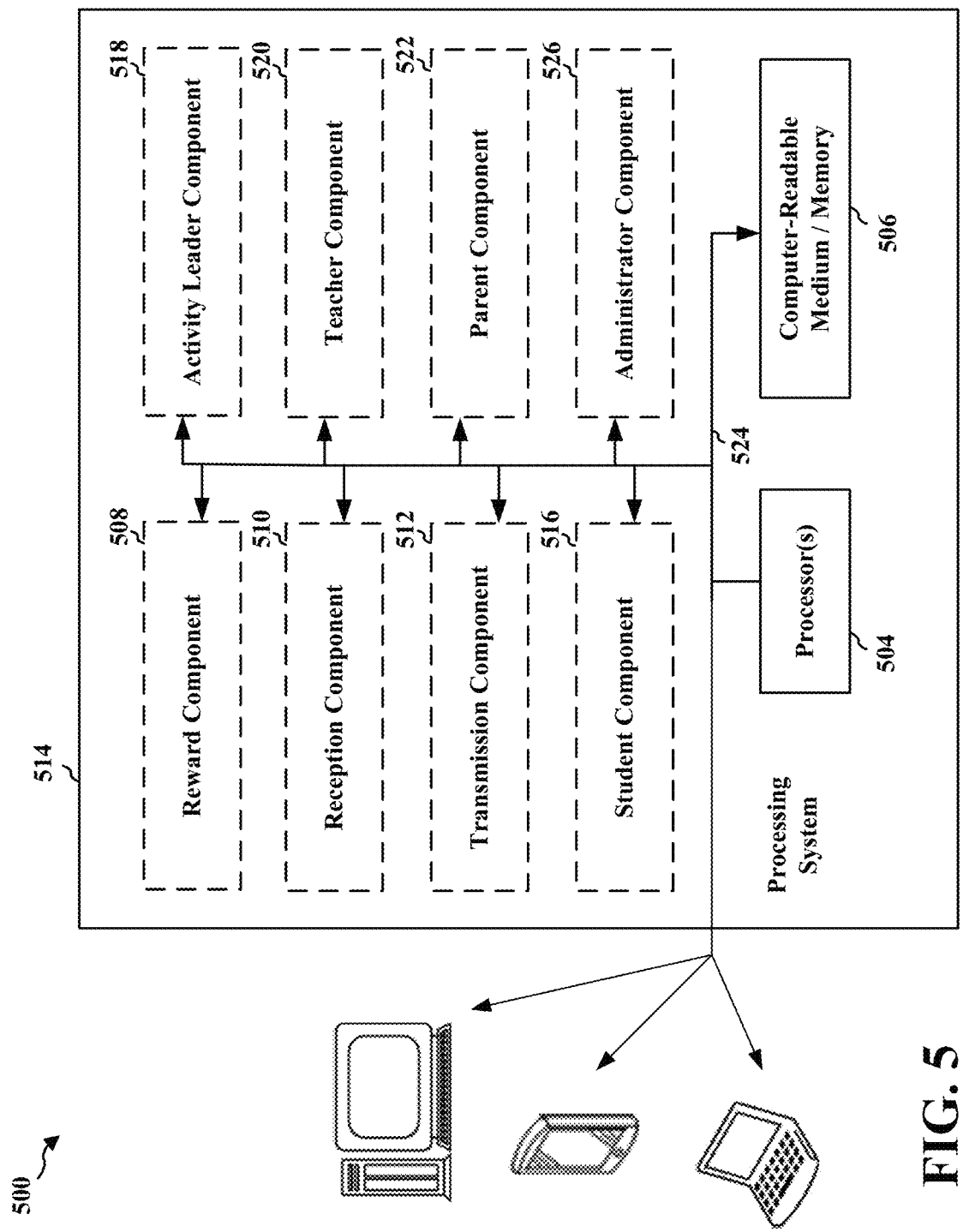
FIG. 5 is a diagram illustrating an example of a hardware implementation for an apparatus employing a processing system in accordance with aspects presented herein.

FIG. 5 is a diagram 500 illustrating an example of a hardware implementation for a processing system 514 for encouraging student conversation. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the components 508, 510, 512, 516, 518, 520, 522, 526, and the computer-readable medium/memory 506. The bus 524 may also link various other circuits such as timing sources, peripherals, voltage regulators, and power management circuits, which are well known in the art, and therefore, will not be described any further.

The reception component and transmission component provide a means for communicating with various other apparatus over a transmission medium. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the components 508, 510, 512, 516, 518, 520, 522, 526. The components may be software components running in the processor 504, resident/stored in the computer readable medium/memory 506, one or more hardware components coupled to the processor 504, or some combination thereof.

The apparatus or system may include additional components that perform each of the blocks of the algorithm in the aforementioned flowchart of FIG. 3 and the additional function described throughout the application, e.g., in connection with FIGS. 4 and 6-14. As such, each block in the aforementioned flowcharts of FIG. 3, and the aspects of FIGS. 4-16 may be performed by a component and the apparatus/system may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Although aspects may been described using the terms "student," "parent", and "teacher/leader," aspects may be applied to participants in activities that are not school related, such as sports, boy scouts, and other activities. Additionally, the aspects described for a parent may be applied for a guardian or other caretaker.

Furthermore, while the aspects have been presented using the example of a school setting and a parent/child relationship, the aspects may be extended to other parties. For example, a communication system may be provided based on the aspects described herein to assist people dealing with brain trauma due injury or disease, e.g., Alzheimer's, dementia, etc. In this example, the aspects may be provided in a healthcare or caretaker scenario rather than a teacher scenario. The individual, or their caretaker/healthcare provider, may be able to enter a limited descriptive entry, e.g., a GAB, similar to the student in the examples supra. While a healthcare provider/caretaker may prompt the individual to enter a GAB, the individual may similarly enter the GAB at will. This may enable the individual to enter hints/information that may assist their recall in later discussions. While a healthcare provider may review the entry, similar to the teacher in the example, above, the entry by the individual may automatically trigger an indication or report to a connected person. The GAB report may be provided to the connected person in the same manner that the GAB reports were provided to the parent in the examples above. The connected person may be a family member. The GAB report may provide the family member with hints and other information to assist the family member in conversing with the individual in a meaningful manner. The GAB report provides information so that the family member can assist the recall of the individual dealing with a brain injury. The connected person may also be a healthcare provider that receives the GAB report. The GAB report may assist the healthcare provider or other caretaker in giving the individual cues/hints to discuss their care of the individual. A healthcare provider/caretaker may be linked to multiple patients and to multiple family members for each patient, similar to the connections that may be established for a teacher. The healthcare provider/caretaker may not only review/receive GAB entries from their patients, but may be able to enter comments/notes in the same manner as for the teacher described above. The comments/notes may be linked or targeted for all patients, for a group of patients, or for individual patients. In a healthcare setting, the communication system may be set up to enable an individual, e.g., a patient, to also receive or otherwise view the GAB report for themselves.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A system for prompting engaged conversation, the system comprising:
   a memory; and
   at least one processor coupled to the memory and configured to:
   establish a link between a student user and a parent or caretaker user in the system;
   present, to the student user, a user interface to receive a limited descriptive entry from the student user at a first remote terminal to provide a memory prompt to the parent or caretaker user for the student user, wherein the user interface displays a subject matter topic component indicating a topic and an entry component for receiving a limited entry of text associated with the topic from the student user for automatic display to the parent or caretaker user to provide the memory prompt for the student user;
   limit entry, by the student user, of the text of the limited descriptive entry at the entry component of the user interface to at least one of:
   less than a sentence,
   less than 50 characters, or
   less than 10 words;
   store the limited descriptive entry; and
   automatically send a display of the limited descriptive entry including a combination of the subject matter topic and the limited entry of the text to the parent or caretaker user at a second remote terminal, wherein each limited descriptive entry entered by the student user is automatically sent to the parent or caretaker user that is linked to the student user in the system.

2. The system of claim 1, wherein a notification of the limited descriptive entry is sent using at least one of:
   a text message;
   a voicemail;
   an e-mail;
   a display message;
   an application operating at a mobile device; and
   a program operating at the second remote terminal.

3. The system of claim 1, wherein the at least one processor is further configured to:
   provide a second user interface to a third remote terminal prompting an activity leader to review and approve the limited descriptive entry, wherein the parent or caretaker user is notified of the limited descriptive entry after approval is received from the activity leader.

4. The system of claim 1, wherein the at least one processor is further configured to:
   provide a parent or caretaker user interface to the second remote terminal, wherein each limited descriptive entry entered by the student user is displayed to the parent or caretaker second user via the parent or caretaker user interface.

5. The system of claim 4, wherein the parent or caretaker user interface provides a scramble option to prompt the limited descriptive entry to be discussed using one of a plurality of presentation types.

6. The system of claim 5, wherein the plurality of presentation types includes at least two of conversation, charades, singing, a game, and drawing.

7. The system of claim 4, wherein the parent or caretaker user interface displays a user selectable button selection of which indicates to the system that a discussion of the limited descriptive entry with the student user has occurred, wherein the user selectable button is labeled with an indication that the discussion has occurred, the memory and at least one processor being further configured to:
 store an indication that the parent or caretaker user completed discussion of the limited descriptive entry with the student user, in response to selection of the user selectable button at the parent or caretaker user interface.

8. The system of claim 1, further comprising a reward component configured to:
 maintain a record of points associated with at least one of:
  a first number of limited descriptive entries from the student user,
  a second number of limited descriptive entries from the student user that are accessed by the parent or caretaker user, or
  a third number of completed limited descriptive entries that are indicated as being discussed via a second user interface presented to the parent or caretaker user.

9. The system of claim 1, wherein the at least one processor is further configured to:
 provide an administrator user interface for receiving an administrator entry from an administrator associated with the student user, wherein the administrator entry is provided to the parent or caretaker user.

10. The system of claim 1, wherein the at least one processor is further configured to provide a leader user interface allowing a creation of an account for an activity leader and to allow the parent or caretaker user to establish a connection to the account for the activity leader to receive access to activity entries entered by the activity leader.

11. The system of claim 1, wherein the student user is a first type of user that enters limited descriptive entries and the parent or caretaker user is a second type of user that receives the limited descriptive entries from at least one of the first type of users, and the at least one processor is further configured to:
 establish an additional link between an activity leader account associated with the student user, and an account for the parent or caretaker user in order to provide access to the limited descriptive entry from the student user to the parent or caretaker user.

12. The system of claim 11, wherein the at least one processor is further configured to:
 establish links between the activity leader account and multiple parent accounts.

13. The system of claim 11, wherein a single parent account is linked to multiple teacher accounts for at least one student.

14. The system of claim 1, wherein the parent or caretaker user is linked to multiple student users, wherein the at least one processor is further configured to present an option to scramble multiple limited descriptive entries from the multiple student users to present them to the parent or caretaker user in a random order.

15. The system of claim 1, wherein the at least one processor is further configured to:
 receive a second entry from at least one of a teacher user interface for a teacher associated with the student user, an administrator user interface for an administrator associated with the student user, and an activity leader user interface for an activity leader associated with the student user; and
 notify the parent or caretaker user of the second entry.

16. A computer implemented method of prompting student engaged conversation, the method comprising:
 establishing a link between a student user and a parent or caretaker user in a system;
 presenting, to the student user, a user interface to receive a limited descriptive entry from the student user at a first remote terminal to provide a memory prompt to the parent or caretaker user for the student user, wherein the user interface displays a subject matter topic component indicating a topic and an entry component for receiving a limited entry of text associated with the topic from the student user for automatic display to the parent or caretaker user to provide the memory prompt for the student user;
 limiting entry, by the student user, of the text of the limited descriptive entry at the entry component of the user interface to at least one of:
  less than a sentence,
  less than 50 characters, or
  less than 10 words;
 storing the limited descriptive entry; and
 automatically sending a visual display of the limited descriptive entry including a combination of the subject matter topic and the limited entry of the text to the parent or caretaker user at a second remote terminal, wherein each limited descriptive entry entered by the student user is automatically sent for display to the parent or caretaker user that is linked to the student user in the system.

17. A non-transitory computer-readable medium storing computer executable code for prompting student engaged conversation, comprising code that when executed by a processor causes the processor to:
 establish a link between a student user and a parent or caretaker user in a system;
 present, to the student user, a user interface to receive a limited descriptive entry from the student user at a first remote terminal to provide a memory prompt to the parent or caretaker user for the student user, wherein the user interface displays a subject matter topic component indicating a topic and an entry component for receiving a limited entry of text associated with the topic from the student user for automatic display to the parent or caretaker user to provide the memory prompt for the student user;
 limit entry, by the student user, of the text of the limited descriptive entry at the entry component of the user interface to at least one of:
  less than a sentence,
  less than 50 characters, or
  less than 10 words;
 store the limited descriptive entry; and
 automatically send a visual display of the limited descriptive entry including a combination of the subject matter topic and the limited entry of the text to the parent or caretaker user at a second remote terminal, wherein each limited descriptive entry entered by the student user is automatically sent for display to the parent or caretaker user that is linked to the student user in the system.

18. The system of claim 1, wherein the entry component limits the text entered by the student user at the entry component to less than 30 characters or less than 5 words.

19. The system of claim 8, wherein the reward component is further configured to:

customize the student user interface in exchange for the points accumulated by the student user.

20. The system of claim 1, further comprising:

a platform for exchanging products, each of the products comprising formats for limited descriptive entries.

21. The system of claim 1, wherein the subject matter topic component comprises a drop down menu presenting topic options for selection by the student user, such that the limited descriptive entry comprises a combination of the topic selected from the drop down menu presenting the topic options and the entry component for receiving the limited entry of the text from the student user.

22. The system of claim 1, wherein the system is further configured to:

establish an additional link between a teacher user and a plurality of student users, the plurality of student users including the student user; and receive entry of a subject matter topic from the teacher user, wherein the user interface that is configured to receive the limited descriptive entry from the student user presents, to the student user, the subject matter topic entered by the teacher user and the entry component that is configured to receive the limited entry of the text corresponding to the subject matter topic entered by the teacher user.

* * * * *